United States Patent
Johnson

(10) Patent No.: US 10,749,232 B2
(45) Date of Patent: Aug. 18, 2020

(54) THERMO-ELECTROCHEMICAL CONVERTER WITH INTEGRATED ENERGY STORAGE

(71) Applicant: Johnson IP Holding, LLC, Atlanta, GA (US)

(72) Inventor: Lonnie G. Johnson, Atlanta, GA (US)

(73) Assignee: JOHNSON IP HOLDING LLC, Atlanta, GA (US)

( * ) Notice: Subject to any disclaimer, the term of this patent is extended or adjusted under 35 U.S.C. 154(b) by 0 days.

(21) Appl. No.: 15/556,692

(22) PCT Filed: Mar. 9, 2016

(86) PCT No.: PCT/US2016/021508
§ 371 (c)(1),
(2) Date: Sep. 8, 2017

(87) PCT Pub. No.: WO2016/145043
PCT Pub. Date: Sep. 15, 2016

(65) Prior Publication Data
US 2018/0108960 A1 Apr. 19, 2018

Related U.S. Application Data

(60) Provisional application No. 62/219,977, filed on Sep. 17, 2015, provisional application No. 62/130,227, filed on Mar. 9, 2015.

(51) Int. Cl.
*H01M 14/00* (2006.01)
*F25B 41/02* (2006.01)
(Continued)

(52) U.S. Cl.
CPC ........... *H01M 14/005* (2013.01); *F25B 41/02* (2013.01); *H01M 4/383* (2013.01);
(Continued)

(58) Field of Classification Search
None
See application file for complete search history.

(56) References Cited

U.S. PATENT DOCUMENTS

| 4,292,378 A | 9/1981 | Krumpelt et al. |
| 4,677,038 A * | 6/1987 | Salomon ................. F25B 41/02 429/101 |

(Continued)

OTHER PUBLICATIONS

Int'l Preliminary Report on Patentability dated Sep. 21, 2017 in Int'l Application No. PCT/US2016/021508.

(Continued)

*Primary Examiner* — Daniel S Gatewood
(74) *Attorney, Agent, or Firm* — Panitch Schwarze Belisario & Nadel LLP

(57) ABSTRACT

An electrochemical direct heat to electricity converter includes a primary thermal energy source; a working fluid; an electrochemical cell comprising at least one membrane electrode assembly including a first porous electrode, a second porous electrode and at least one membrane, wherein the at least one membrane is sandwiched between the first and second porous electrodes and is a conductor of ions of the working fluid; an energy storage reservoir; and an external load. The electrochemical cell operates on heat to produce electricity. When thermal energy available from the primary thermal energy source is greater than necessary to meet demands of the external load, excess energy is stored in the energy storage reservoir, and when the thermal energy available from the primary thermal energy source is insufficient to meet the demands of the external load, at least a portion of the excess energy stored in the energy storage reservoir is used to supply power to the external load.

4 Claims, 18 Drawing Sheets

(51) Int. Cl.
*H01M 8/04014* (2016.01)
*H01M 8/04082* (2016.01)
*H01M 8/04089* (2016.01)
*H01M 4/38* (2006.01)
*H01M 8/18* (2006.01)
*F25B 27/00* (2006.01)
*F25B 9/14* (2006.01)

(52) U.S. Cl.
CPC ... *H01M 8/04014* (2013.01); *H01M 8/04089* (2013.01); *H01M 8/04216* (2013.01); *H01M 8/18* (2013.01); *F25B 9/14* (2013.01); *F25B 27/00* (2013.01); *H01M 2250/40* (2013.01); *Y02E 60/56* (2013.01)

(56) References Cited

U.S. PATENT DOCUMENTS

| | | | |
|---|---|---|---|
| 6,949,303 B1* | 9/2005 | Johnson | H01M 14/00 429/101 |
| 2002/0127441 A1 | 9/2002 | Johnson | |
| 2003/0203276 A1 | 10/2003 | Johnson et al. | |
| 2012/0064419 A1 | 3/2012 | Johnson | |

OTHER PUBLICATIONS

Int'l Search Report and Written Opinion dated Aug. 11, 2016 in Int'l Application No. PCT/US2016/021508.

Gellender, M., "A proposed new energy source: The "mixing energy" of engine exhaust gas," Journal of Renewable and Sustainable Energy, vol. 2, pp. 023101-1-023101-14 (2010).

Joshi, Dr. Ashok V., "Thermoelectric Conversion with Ion Conductors," Final Report, Contract #N00014-86-C-0827, 40 pages (Jan. 1990).

Virkar et al., "Theoretical Assessment of an Oxygen Heat Engine: The Effect of Mass Transport Limitation," Energy Convers. Mgmt., vol. 32, No. 4, pp. 359-370 (1991).

Extended European Search Report dated Apr. 20, 2020 in EP Application No. 19214382.4.

Office Action dated Apr. 14, 2020 in EP Application No. 16713186.1.

\* cited by examiner

THERMO-ELECTROCHEMICAL CONVERTER WITH INTEGRATED ENERGY STORAGE

CROSS-REFERENCE TO RELATED APPLICATION

This application is a section 371 of International Application PCT/US16/21508, filed Mar. 9, 2016, which was published in the English language on Sep. 15, 2016 under International Publication No. WO 2016/145043, and which claims the benefit of U.S. Provisional Application No. 62/219,977 filed on Sep. 17, 2015 and U.S. Provisional Application No. 62/130,227 filed on Mar. 9, 2015, the entire contents of which are incorporated herein by reference in their entirety.

BACKGROUND OF THE INVENTION

The present invention relates to an improved Johnson Thermo-Electrochemical Convertor (JTEC) with integrated thermal energy storage using metal hydride materials.

The need for energy systems that are capable of both electrical energy generation and energy storage is well understood. Typically power generation systems have production profiles that are different from the energy demand profile. For example, coal power plants optimally produce power at a steady, continuous level. However, the demand for power from coal plants generally has two peaks, one in the morning and one in the evening. Demand for power during the day is higher than nighttime demand. Regarding renewable energy systems, such as solar, power generation peaks during midday and is not at all available at night. Heat energy is the dominant energy source used in electrical power generation. Electrochemical batteries are used when energy storage is required for systems that operate on heat. Such systems must first produce the electricity and then supply it to batteries for storage.

Mechanical heat engines have also been designed and used to produce electrical power. Such mechanical heat engines operate on thermodynamic cycles wherein shaft work is performed using a piston or turbine to compress a working fluid. The compression process is performed at a low temperature and, after compression, the working fluid is raised to a higher temperature. At the high temperature, the working fluid is allowed to expand against a load, such as a piston or turbine, thereby producing shaft work. A key to the operation of all engines employing a working fluid is that less work is required to compress the working fluid at low temperatures than is produced by expanding it at high temperatures. This is the case for all thermodynamic engines employing a working fluid.

For example, steam engines operate on the Rankine thermodynamic cycle, wherein water is pumped to a high pressure, and then heated to steam and expanded through a piston or turbine to perform work. Internal combustion engines operate on the Otto cycle, wherein low-temperature ambient air is compressed by a piston and then heated to very high temperatures via fuel combustion inside the cylinder. As the cycle continues, the expansion of the heated air against the piston produces more work than that consumed during the lower temperature compression process. However, the prior art mechanical devices do not achieve the high compression ratios with near constant temperature compression and expansion processes needed to approximate Carnot-equivalent cycles.

The Stirling engine was developed by Robert Stirling in 1816 to operate on the Stirling cycle in an effort to provide an engine that has high efficiency and offers greater versatility in the selection of the heat source. The ideal Stirling thermodynamic cycle is of equivalent efficiency to the ideal Carnot cycle, which defines the theoretical maximum efficiency of an engine operating on heat input at high temperatures and heat rejection at low temperatures. However, as with all mechanical engines, the Stirling engine suffers from reliability problems and efficiency losses associated with its mechanical moving parts.

In an effort to avoid the problems inherent with mechanical heat engines, Alkali Metal Thermoelectric Conversion (AMTEC) cells have been designed as a thermo-electrochemical heat engine. AMTEC heat engines utilize pressure to generate a voltage potential and electrical current by forcing an ionizable working fluid, such as sodium, through an electrochemical cell at high temperatures. The electrodes couple the electrical current to an external load. Electrical work is performed as the pressure differential across the electrolyte separator forces sodium atoms through the electrolyte. The sodium is ionized upon entering the electrolyte, thereby releasing electrons to the external circuit. On the other side of the electrolyte, the sodium ions recombine with the electrons to reconstitute sodium upon leaving the electrolyte, in much the same way as the process that occurs in battery and fuel cell type electrochemical cells. The reconstituted sodium, which is at a low pressure and a high temperature, leaves the electrochemical cell as an expanded gas. The gas is then cooled and condensed back to a liquid state. The resulting low-temperature liquid is then re-pressurized. Operation of an AMTEC engine approximates the Rankine thermodynamic cycle.

Numerous publications are available on AMTEC technology. See, for example, *Conceptual design of AMTEC demonstrative system for* 100 *t/d garbage disposal power generating facility*, Qiuya Ni et al. (Chinese Academy of Sciences, Inst. of Electrical Engineering, Beijing, China). Another representative publication is *Intersociety Energy Conversion Engineering Conference and Exhibit* (IECEC), 35th, Las Vegas, Nev. (Jul. 24-28, 2000), Collection of Technical Papers. Vol. 2 (A00-37701 10-44). Also see American Institute of Aeronautics and Astronautics, 190, p. 1295-1299. REPORT NUMBER(S)-AIAA Paper 2000-3032.

AMTEC heat engines suffer from reliability and efficiency issues due to the highly corrosive nature of the alkali metal working fluid. AMTEC engines also have very limited utility. Specifically, AMTEC engines can only be operated at very high temperatures because ionic conductive solid electrolytes achieve practical conductivity levels only at high temperatures. Indeed, even the low-temperature pressurization process must occur at a relatively high temperature, because the alkali metal working fluid must remain above its melt temperature at all times as it moves through the cycle. Mechanical pumps and even magneto-hydrodynamic pumps have been used to pressurize the low-temperature working fluid. Also, the AMTEC operates on a modified Rankine thermodynamic cycle that includes latent heat entropy losses and enthalpy losses which cannot be compensated. These losses include heat input for the high temperature phase change from liquid to vapor prior to expanding through the high temperature membrane electrode assembly (MEA) and exiting from the MEA as a superheated vapor only to condense at the low temperature with no work being performed.

In an effort to overcome the above-described drawbacks of conventional mechanical and thermo-electrochemical heat engines, the Johnson Thermo-Electrochemical Convertor (JTEC) system (disclosed in U.S. Pat. No. 7,160,639 filed Apr. 28, 2003) was developed.

The JTEC is a transformational technology that employs well-known principles of thermodynamics using fuel cell like MEA stacks. However, the JTEC is not a fuel cell. It does not require oxygen or a continuous fuel supply, only heat. It is a solid-state direct heat to electric conversion technology that has no moving mechanical components other than hydrogen circulation. These innovative features, in combination with operation on the Carnot-equivalent Ericsson thermodynamic cycle, represent a very significant advancement in energy conversion technology. In particular, As a system that converts heat directly into electricity, the JTEC offers revolutionary advancements in energy conversion efficiency, power density and manufacturing cost.

The JTEC operates on the Carnot equivalent Ericsson Thermodynamic cycle. It uses a first electrochemical cell operating at low temperature and coupled to a heat sink (i.e., an "electrochemical compressor" stage of the engine), a second electrochemical cell operating at high temperature and coupled to a heat source (i.e., an "electrochemical expansion" stage of the engine), and a recuperative heat exchanger that couples working fluid flow between the two cells. The JTEC includes a supply of hydrogen or oxygen as a working fluid. Working fluid is compressed in the low temperature cell and expanded in the high temperature cell whereby more work is produced during the high temperature expansion that consumed during compression in the low temperature cell. Each electrochemical cell consists of a MEA configured having a non-porous membrane that is capable of conducting ions of the working fluid and sandwiched between a pair of porous electron conductive electrodes.

In operation, working fluid passes through the MEAs by releasing an electron to the electrode on the entering side. The ions are conducted through the membrane to the opposite electrode. The electrons are coupled to the opposite electrode via an external circuit. The working fluid is reconstituted within the opposite electrode. In operation, power is applied to the low temperature cell to drive working fluid from low pressure to high pressure as heat is removed to maintain a near constant temperature compression process. The high pressure working fluid is supplied from the low temperature cell through the heat exchanger to the high temperature cell. In the high temperature cell, the process operates in reverse. Power is produced by the high temperature cell as working fluid expands through the cell from high pressure to low pressure as heat is added to maintain a near constant temperature expansion process. The resulting low pressure working fluid is supplied back to the low pressure side to the low temperature cell to continue the cycle. As in any thermodynamic engine employing a working fluid and consistent with the nature of compressible gas, a greater amount of work (electrical in this case) is extracted during high temperature expansion than the work input required for the low temperature compression. That is, the expansion process occurring at the high temperature produces enough power to drive the compression process occurring at the low temperature, as well as supply net output power to an external load.

The voltage generated by a MEA is linear with respect to temperature. The high temperature cell has a higher voltage ($V_{HT}$) than the low temperature cell ($V_{LT}$). Working fluid is compressed in the low temperature cell at $V_{LT}$. On the other hand, working fluid is expanded in the high temperature cell at $V_{HT}$ as current (power) is extracted. Since the current (I), hydrogen circulation, is the same through both cells, the voltage difference means that the power generated through the expansion of hydrogen in the high temperature cell is higher than that of the low temperature cell. The power output by the high temperature cell ($V_{HT}$ multiplied by I) is sufficient to drive the compression process in the low temperature cell ($V_{LT}$ multiplied by I) as well as supply net power output to an external load (($V_{HT}-V_{LT}$)*I)). The hydrogen circulates continuously inside the engine and is not consumed.

Ideally, a heat source and heat sink are coupled to the high and low temperature electrochemical cells, respectively, that have sufficient heat transfer to achieve near constant temperature expansion and compression, respectively. Near constant temperature compression and expansion, in combination with coupling a recuperative heat exchanger between the high and low temperature stacks to recuperate heat from fluid leaving the high temperature stack by facilitating its transfer to fluid flowing to the high temperature stack, allows the engine to approximate the thermodynamic Ericsson cycle. Less than optimum operation where the expansion and compression temperatures are not maintained nearly constant can be useful. Useful compression temperatures and useful expansion temperatures may be employed where the average expansion temperature is greater than the average compression temperature resulting in a net higher average expansion voltage than compression voltage and thereby net positive power output.

Still, with various technologies available for producing electricity from heat, the need remains for cost effective energy storage as a means for matching different energy demand profiles. Batteries are typically used to match power production profiles to demand profiles. In batteries, chemical energy is converted into electrical energy and visa-versa. For example, known electrochemical cells or batteries rely on chemical reactions wherein ions and electrons of a reactant being oxidized are transferred to the reactant being reduced via separate paths. Specifically, the electrons are transferred electrically via wiring through an external load where they perform work and the ions are conducted through an electrolyte separator. Battery type electrochemical cells add significant cost to power systems. They are typically constrained in cell size because of inherent safety and reliability problems. Lithium ion batteries, in particular, have a well established reputation of catching fire and even exploding. They can store an amount of energy that is limited by the confines of the battery casing given the amount of available reactants that may be contained therein. Very large packs of small cells are needed in order to meet the storage capacity requirements of electrical power generation systems. The packs typically require environmental control systems to maintain specific battery operating temperatures for reliability and safety. Such control systems add additional costs.

Reversible fuel cells have been developed in an effort to overcome problems associated with battery type electrochemical cells. In conventional fuel cells, the chemical reactants are continuously supplied to and removed from the electrochemical cell. In a manner similar to batteries, fuel cells produce electricity by conducting an ionized species through a selective electrolyte which generally blocks passage of electrons and non-ionized species.

The most common type of fuel cell is a hydrogen-oxygen fuel cell which passes hydrogen through one of the electrodes and oxygen through the other electrode. The hydrogen ions are conducted through the electrolyte separator to the oxygen side of the cell under the chemical reaction potential of the hydrogen and oxygen. Porous electrodes on either side of the electrolyte separator are used to couple the electrons involved in the chemical reaction to an external load via an external circuit. The electrons and hydrogen ions reconstitute hydrogen and complete the reaction with the oxygen on the oxygen side of the cell resulting in the production of water which is expelled from the system. A continuous electrical current is maintained by a continuous supply of hydrogen and oxygen to the cell.

These cells can operate in reverse to store energy by supplying water to the oxygen electrode. Power is applied to the cell to electrolyze the water in a reverse reaction to produce hydrogen and oxygen. However, there are a number of challenging liquid and gas management issues associated with operation of such cells. The MEA stacks in conventional fuel cell applications require bidirectional flow in at least one of the electrodes. For example, oxygen flow into the cathode side of hydrogen-oxygen fuel cells must be maintained as the same time that the hydrogen-oxygen reaction product, water, is exiting. As such, large flow cross-sections for fuel and the oxidizer/reaction product must be an inherent feature of the design of conventional MEA stacks for fuel cells. Cell flooding and polarization losses because of a lack of reactant with in the oxygen electrode are well established problems.

Further, fuel cell environments are very corrosive and typically require the use of an expensive noble metal catalyst (usually platinum), particularly the oxygen electrode. An even greater problem is related to the 0.4V activation energy requirement for the oxygen electrode. The electrochemical potential of a hydrogen-oxygen fuel cell is 1.2 volts. The activation voltage requirement of the oxygen electrode results in an effective output voltage of only 0.8 volts. On the other hand, when recharging or regenerating the cell, a voltage of 1.6 volts is required to overcome the reaction potential in addition to the oxygen activation voltage. Charging at 1.6 volts and discharging at 0.8 volts results in a net energy storage cycle efficiency of only 50% at best. Such cells are further complicated by the need for a thermal management system because the difference in charging and discharging energy is dissipated as waste heat.

Attempts have been made toward the use of heat energy to directly drive regeneration of fuel cells. Osteryoung performed an extensive study toward this objective (see U.S. Pat. No. 5,208,112). However, attempts towards thermal regeneration have generally shown very limited success (see Chum, Helena L. and Osteryoung, Robert A., *Review of Thermally Regenerative Electrochemical Systems*, Solar Energy Research Institute; U.S. Department of Energy Contract No. EG-77-C-01-4042, Vol. 1 and 2, Task No. 3356.10 (August 1980)).

Accordingly, there remains a need for a practical, cost effective electrical power source that operates on heat and that can effectively respond to energy demand profiles in a manner that is independent of the limitations of its primary energy source profile.

BRIEF SUMMARY OF THE INVENTION

The present invention builds on the basic JTEC and incorporates a mechanism for storing significant volumes of working fluid on the high and low pressure sides of the convertor. In one embodiment, the present invention also includes a capability of the JTEC to store thermal energy as an integral feature of the energy convertor. The present invention greatly simplifies the energy storage problems experienced using other approaches, because it eliminates many of the complexities associated with the electronics and control requirements involved with an electrical energy storage medium, such as batteries. Ancillary maintenance requirements, such as electrical charge discharge controls, environmental monitoring and conditioning systems and AC inverters, specifically for the batteries are avoided while, at the same time, maintaining the solid state nature of the convertor.

In one embodiment, the present invention relates to an electrochemical direct heat to electricity converter comprising: a primary thermal energy source; a working fluid; an electrochemical cell comprising at least one membrane electrode assembly including a first porous electrode, a second porous electrode and at least one membrane, wherein the at least one membrane is sandwiched between the first and second porous electrodes and is a conductor of ions of the working fluid; an energy storage reservoir; and an external load. The electrochemical cell operates on heat to produce electricity. When thermal energy available from the primary thermal energy source is greater than necessary to meet demands of the external load, excess energy is stored in the energy storage reservoir, and when the thermal energy available from the primary thermal energy source is insufficient to meet the demands of the external load, at least a portion of the excess energy stored in the energy storage reservoir is used to supply power to the external load.

In another embodiment, the present invention relates to an electrochemical direct heat to electricity converter comprising a working fluid; at least one membrane electrode assembly including a first porous electrode, a second porous electrode and at least one membrane, the at least one membrane being sandwiched between the first and second porous electrodes, the at least one membrane being a conductor of ions of the working fluid; a first conduit containing the working fluid at a first pressure and a second conduit containing the working fluid at a second pressure which is lower than the first pressure, the first conduit being a high pressure conduit coupled to the first porous electrode and the second conduit being a low pressure conduit coupled to the second porous electrode; wherein the converter produces electricity with the expansion of hydrogen through the membrane electrode assembly from the high pressure conduit to the low pressure conduit, a primary thermal energy source coupled to the at least one membrane electrode assembly; an external load; and an energy storage reservoir. When thermal energy available from the primary thermal energy source is greater than necessary to meet demands of the external load, excess energy is stored in the energy storage reservoir, and when the thermal energy available from the primary thermal energy source is insufficient to meet the demands of the external load, at least a portion of the excess energy stored in the energy storage reservoir is used to supply power to the external load.

In yet another embodiment, the present invention relates to an electrochemical direct heat to electricity converter comprising a working fluid; a first membrane electrode assembly including a high pressure porous electrode, a low pressure porous electrode and at least one membrane, wherein the at least one membrane is sandwiched between the first and second porous electrodes and is a conductor of ions of the working fluid; a first conduit containing the working fluid at a first pressure and a second conduit containing the working fluid at a second pressure which is lower than the first pressure, the first conduit being a high pressure conduit coupled to the high pressure porous electrode and the second conduit being a low pressure conduit coupled to the low pressure porous electrode; a high pressure working fluid storage reservoir coupled to the high pressure conduit; a low pressure working fluid storage reservoir coupled to the low pressure conduit; and a controller. The electrochemical converter produces electrical energy when the working fluid expands through the membrane electrode assembly from high pressure to low pressure when power is extracted from the first membrane electrode assembly and the electrochemical converter stores electrical energy when the compressed working fluid is compressed through the first membrane electrode assembly from low pressure to high pressure when power is supplied to the first membrane electrode assembly by the controller.

In a further embodiment, the present invention relates to an electrochemical direct heat to electricity converter comprising: a working fluid; at least one membrane electrode assembly including a first porous electrode, a second porous electrode and at least one membrane, wherein the at least one membrane is a conductor of ions of the working fluid; a first conduit containing the working fluid at a first pressure and a second conduit containing the working fluid at a second pressure which is lower than the first pressure, wherein the first conduit is a high pressure conduit coupled to the first porous electrode and the second conduit is a low pressure conduit coupled to the second porous electrode; and a high pressure working fluid storage reservoir and a low pressure working fluid storage reservoir for energy storage. The convertor stores energy as pressurized working fluid by pumping the working fluid from the low pressure working fluid storage reservoir to the high pressure working fluid storage reservoir, and the convertor converts the stored energy into electrical energy as needed by extracting energy from the pressurized working fluid by expanding the working fluid from the high pressure working fluid storage reservoir back to the low pressure working fluid storage reservoir.

BRIEF DESCRIPTION OF THE SEVERAL VIEWS OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings.

DETAILED DESCRIPTION OF THE INVENTION

Figure 1:
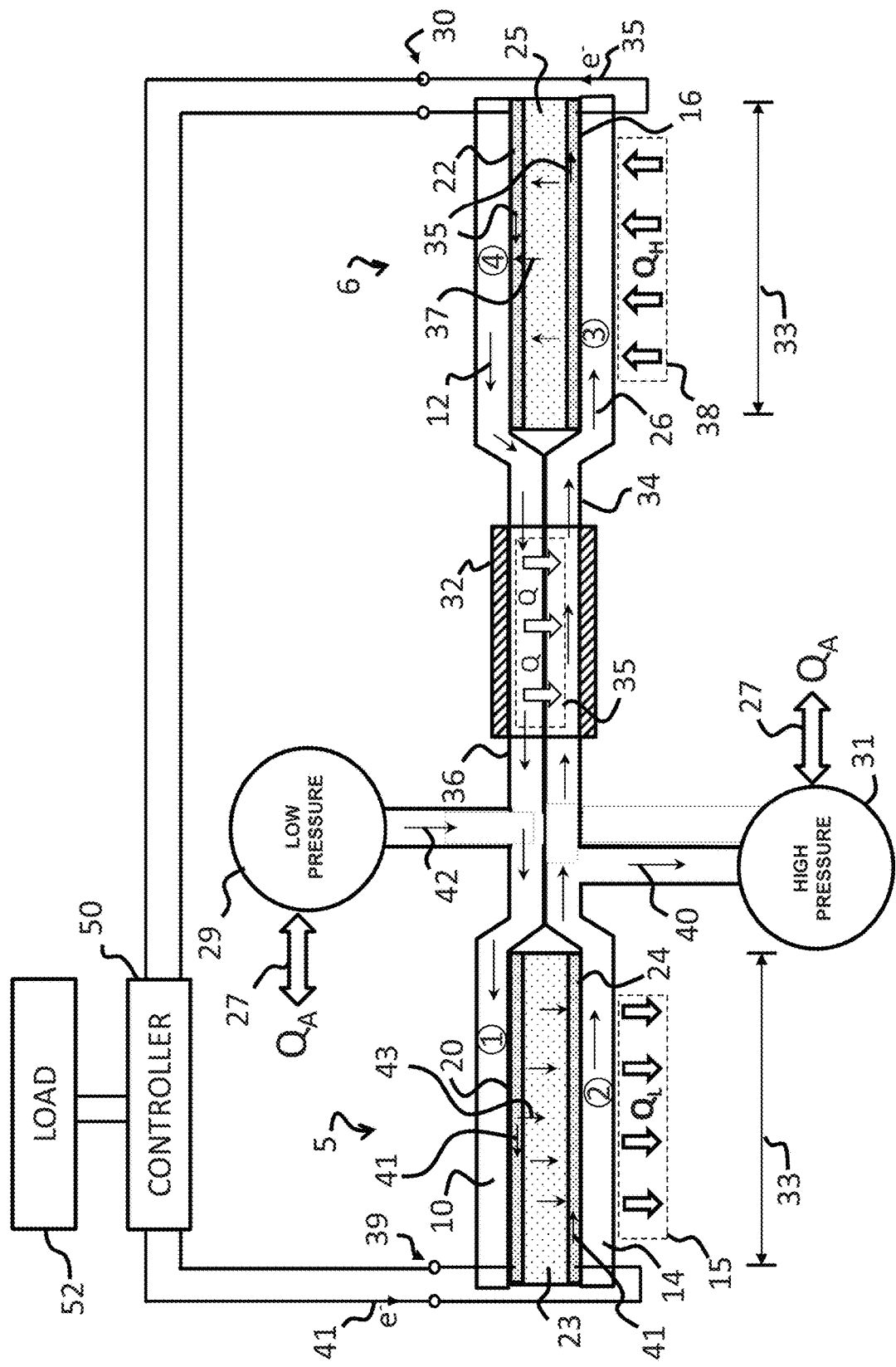
FIG. 1 is a diagram of a JTEC including two MEAs connected back to back by a recuperative heat exchanger and having reservoirs to store ionizable working fluid at high and low pressure in accordance with an embodiment of the present invention, wherein the JTEC is operating on heat from a primary source to generate power and store energy as compressed working fluid.

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

It will also be understood that terms such as "first," "second," and the like are provided only for purposes of clarity. The elements or components identified by these terms, and the operations thereof, may easily be switched.

In one embodiment, the invention relates to an electrochemical direct heat to electricity converter comprising: a primary thermal energy source; a working fluid; an electrochemical cell comprising at least one membrane electrode assembly including a first porous electrode, a second porous electrode and at least one membrane, wherein the at least one membrane is sandwiched between the first and second porous electrodes and is a conductor of ions of the working fluid; an energy storage reservoir; and an external load. The electrochemical cell operates on heat to produce electricity. When thermal energy available from the primary thermal energy source is greater than necessary to meet demands of the external load, excess energy is stored in the energy storage reservoir, and when the thermal energy available from the primary thermal energy source is insufficient to meet the demands of the external load, at least a portion of the excess energy stored in the energy storage reservoir is used to supply power to the external load.

In another embodiment, the invention relates to an electrochemical direct heat to electricity converter comprising a working fluid; at least one membrane electrode assembly including a first porous electrode, a second porous electrode and at least one membrane, the at least one membrane being sandwiched between the first and second porous electrodes, the at least one membrane being a conductor of ions of the working fluid; a first conduit containing the working fluid at a first pressure and a second conduit containing the working fluid at a second pressure which is lower than the first pressure, the first conduit being a high pressure conduit coupled to the first porous electrode and the second conduit being a low pressure conduit coupled to the second porous electrode; wherein the converter produces electricity with the expansion of hydrogen through the membrane electrode assembly from the high pressure conduit to the low pressure conduit, a primary thermal energy source coupled to the at least one membrane electrode assembly; an external load; and an energy storage reservoir. When thermal energy available from the primary thermal energy source is greater than necessary to meet demands of the external load, excess energy is stored in the energy storage reservoir, and when the thermal energy available from the primary thermal energy source is insufficient to meet the demands of the external load, at least a portion of the excess energy stored in the energy storage reservoir is used to supply power to the external load.

In a preferred embodiment, the energy storage reservoir is a heat storage reservoir and the membrane electrode assembly is thermally coupled to the heat storage reservoir and produces electrical power as heat is supplied from the reservoir to the membrane electrode assembly with the expansion of working fluid there through. When heat available from the primary thermal energy source is greater than necessary to meet the demands of the external load, heat is stored in the heat storage reservoir, and when the heat available from the primary thermal energy source is insufficient to meet the demands of the external load, at least a portion of the heat stored in the heat storage reservoir is used to generate power to be supplied to the external load therein.

It is within the scope of the invention for heat storage reservoir to store heat energy as a latent heat of hydrogen desorption from a metal hydride material.

In a further embodiment, the invention includes an electrochemical direct heat to electricity converter comprising: a working fluid; a first membrane electrode assembly including a high pressure porous electrode, a low pressure porous electrode and at least one membrane, wherein the at least one membrane is sandwiched between the first and second porous electrodes and is a conductor of ions of the working fluid; a first conduit containing the working fluid at a first pressure and a second conduit containing the working fluid at a second pressure which is lower than the first pressure, the first conduit being a high pressure conduit coupled to the high pressure porous electrode and the second conduit being a low pressure conduit coupled to the low pressure porous electrode; a high pressure working fluid storage reservoir coupled to the high pressure conduit; a low pressure working fluid storage reservoir coupled to the low pressure conduit; and a controller. The electrochemical converter produces electrical energy when the working fluid expands through the membrane electrode assembly from high pressure to low pressure when power is extracted from the first membrane electrode assembly and the electrochemical converter stores electrical energy when the compressed working fluid is compressed through the first membrane electrode assembly from low pressure to high pressure when power is supplied to the first membrane electrode assembly by the controller.

In a preferred embodiment, the working fluid is hydrogen and the converter further comprises a high pressure metal hydride hydrogen storage reservoir coupled to the high pressure conduit and a low pressure metal hydride hydrogen storage reservoir coupled to the low pressure conduit.

It is also within the scope of the invention for the converter to contain a first heat sink and a first heat source coupled to the low pressure metal hydride hydrogen storage reservoir and a second heat sink and a second heat source coupled to the high pressure metal hydride hydrogen storage reservoir. The first heat source supplies heat of desorption to the low pressure metal hydride storage reservoir during desorption of hydrogen by the low metal hydride storage reservoir and the first heat sink removes heat of absorption during absorption of hydrogen, and the second heat source supplies heat of desorption to the high pressure metal hydride storage reservoir during desorption of hydrogen by the high pressure metal hydride storage reservoir and the second heat sink removes heat of absorption during absorption of hydrogen.

The converter may also contain a primary sink and a primary heat source coupled to the first membrane electrode assembly. The primary heat sink removes heat from the first membrane electrode assembly to maintain a useful temperature of compression, and the primary heat source supplies heat to the membrane electrode assembly during hydrogen expansion to maintain a useful temperature of expansion.

In a preferred embodiment, the converter further comprises a second membrane electrode assembly including a high pressure porous electrode, a low pressure porous electrode and at least one membrane being a conductor of ions of the working fluid. The high pressure conduit is coupled to the high pressure porous electrode of the second membrane electrode assembly and the low pressure conduit is coupled to the low pressure porous electrode of the second membrane electrode assembly. In such an embodiment, the primary heat sink is coupled to the first membrane electrode assembly and removes heat from the second membrane electrode assembly to maintain a relatively constant temperature of compression and the primary heat source is coupled to the second membrane electrode assembly and supplies heat to the second membrane electrode assembly during hydrogen expansion to maintain a useful temperature of expansion. The second membrane electrode assembly produces electrical energy when the working fluid expands through the second membrane electrode assembly from high pressure to low pressure as power is extracted from the second membrane electrode assembly, and the first membrane electrode assembly compresses working fluid from low pressure to high pressure through the first membrane electrode assembly when power is supplied to the first membrane electrode assembly.

It is within the scope of the invention for the first metal hydride storage reservoir to be at a predetermined temperature elevated above a temperature of the second metal hydride storage reservoir with heat input from the heat source; the hydrogen pressure of the first metal hydride storage reservoir exceeds a hydrogen pressure of the second metal hydride storage reservoir.

It is also within the scope of the invention for the hydrogen pressure of the second metal hydride storage reservoir to be maintained to be lower than the hydrogen pressure of the first metal hydride storage reservoir at a temperature below a temperature of the first metal hydride storage reservoir with heat output to the heat sink.

In one embodiment, the heat energy stored in the thermal energy storage reservoir is released by the first metal hydride storage reservoir at the predetermined elevated temperature, migrates to the lower temperature second metal hydride storage reservoir and is absorbed by the metal hydride material therein with its heat of absorption being rejected to the heat sink.

When the heat energy available from the heat source is insufficient to meet demands of the external load and a temperature of the first metal hydride storage reservoir is at a level such that a hydrogen pressure of the first metal hydride storage reservoir is below a hydrogen pressure of the second metal hydride storage reservoir, heat is extracted from the heat sink as the latent heat of desorption as hydrogen is released by the second metal hydride storage reservoir, migrates to the first metal hydride storage reservoir and is absorbed by the metal hydride material therein with its heat of absorption being rejected to the convertor.

In a further embodiment, the invention relates to an electrochemical direct heat to electricity converter comprising: a working fluid; at least one membrane electrode assembly including a first porous electrode, a second porous electrode and at least one membrane, wherein the at least one membrane is a conductor of ions of the working fluid; a first conduit containing the working fluid at a first pressure and a second conduit containing the working fluid at a second pressure which is lower than the first pressure, wherein the first conduit is a high pressure conduit coupled to the first porous electrode and the second conduit is a low pressure conduit coupled to the second porous electrode; and a high pressure working fluid storage reservoir and a low pressure working fluid storage reservoir for energy storage. The convertor stores energy as pressurized working fluid by pumping the working fluid from the low pressure working fluid storage reservoir to the high pressure working fluid storage reservoir, and the convertor converts the stored energy into electrical energy as needed by extracting energy from the pressurized working fluid by expanding the working fluid from the high pressure working fluid storage reservoir back to the low pressure working fluid storage reservoir.

In preferred embodiments, the working fluid is hydrogen and the high pressure and low pressure working fluid storage reservoirs, which may be thermally coupled to each other, contain high pressure and low pressure metal hydride material for hydrogen storage.

The converter may also contain an external load and first and second thermal energy storage reservoirs for use as energy sources for power generation when thermal energy available from a heat source is insufficient to meet demands of the external load. One of the first and second thermal storage reservoirs is coupled to the high pressure working fluid storage reservoir and the second of the first and second thermal storage reservoirs is coupled to the low pressure working fluid storage reservoir, and the first and second thermal storage reservoirs store and release thermal energy as needed to minimize temperature changes of the high pressure and low pressure working fluid storage reservoirs when the working fluid is being compressed into or expanded out of the high pressure and low pressure working fluid storage reservoirs. When thermal energy available from the primary thermal energy source is greater than necessary to meet demands of the external load, excess energy is stored in at least one of the energy storage reservoirs, and when the thermal energy available from the primary thermal energy source is insufficient to meet the demands of the external load, at least a portion of the excess energy stored in at least one of the energy storage reservoirs is used to supply power to the external load Referring to the drawings in detail, wherein like numerals indicate like elements throughout the several views, FIGS. 1 through 18 show preferred embodiments of a JTEC having energy storage capability. The terms "electrochemical cell," "membrane electrode assembly cell," "MEA cell," "cell" and stack are used interchangeably herein, stack referring to a group or an array of individual cells.

In the present invention, as in a conventional JTEC, during operation, heat is supplied from a primary source at an elevated temperature. Power is produced by working fluid expanding through a MEA that is thermally coupled to the heat source. The amount of power produced during the expansion is sufficient to power the compression of working fluid by the low temperature MEA plus supply power to an external load. In a JTEC according to the prior art, the low temperature MEA would consume only enough power to compress an amount of working fluid needed to sustain the ongoing expansion across the high temperature MEA. In one possible embodiment of the present invention; however, power that is not used by the external load is used by the low temperature MEA to compress an amount of working fluid from the low pressure side of the engine to the high pressure side that is in excess of that needed to sustain the ongoing expansion across the high temperature MEA. The net effect is that excess generated energy is stored as high pressure working fluid on the high pressure side of the engine.

During periods when power generated from heat input from the engine's primary heat source is insufficient to meet load demands, the compression operation of the low temperature MEA may be terminated. Under this condition, operation of the engine can continue as high pressure working fluid stored on the high pressure side is allowed to expand through either the high temperature MEA or the low temperature MEA as a means for generating power such that continued power demands can be met.

One embodiment of the present invention relates to the use of hydrogen as a working fluid, wherein a metal hydride material is employed for hydrogen storage on the high and low pressure sides of the engine. In a preferred embodiment, the high pressure and low pressure hydrogen storage reservoirs are thermally coupled to each other, such that as hydrogen is moved back and forth between the two storage reservoirs and the heat of absorption that is released by one reservoir is coupled to the other reservoir and employed as heat of desorption.

According to another embodiment of the present invention, the system may include a thermal storage medium or reservoir coupled to the elevated temperature heat source, such that when heat is available from the source, heat energy can be absorbed and stored for subsequent use in maintaining an elevated temperature during the expansion of the working fluid in the absence of the primary heat source.

In one embodiment, sections of the high pressure channels and sections of the low pressure channels are preferably physically coupled to each other in the form of a recuperative heat exchanger to recuperate heat from the working fluid leaving the high temperature MEA stack by coupling it to the working fluid flowing to the high temperature MEA stack. Providing such a recuperative heat exchanger in combination with a heat source and heat sink coupled to the high and low temperature electrochemical cells (i.e., MEA stacks) enables sufficient heat transfer for near constant temperature expansion and compression processes, thereby allowing the engine to approximate the Ericsson thermodynamic cycle.

In another embodiment, in which the MEA stacks operate as part of a heat pump application, the first MEA stack is preferably coupled to a heat source that is at a reduced temperature and the second MEA stack is preferably coupled to a heat sink that is at an elevated temperature relative to the heat source of the first MEA stack. Working fluid is expanded at a low temperature in the first MEA stack as the heat of expansion is extracted from the low temperature heat source. Working fluid is compressed at an elevated temperature in the second MEA stack, and the heat of compression is rejected at the elevated temperature. Because of the low temperature of the first MEA stack, the first MEA stack produces a Nernst voltage that is less than that of the high temperature MEA stack. An external power source is connected in series with the low temperature MEA stack in order to provide a combined voltage that is high enough to overcome the Nernst potential of the high temperature MEA stack and thereby drive the compression process therein. During periods when power is not available, expansion of the working fluid and the extraction of heat thereby may be maintained by continued expansion of the compressed working fluid through the low temperature MEA from the high pressure side of the engine to the low pressure side.

Referring to FIG. 1, there is shown a direct heat to electricity convertor or heat engine and, more particularly, a JTEC having energy storage capability in accordance with a preferred embodiment of the present invention. The structure of the JTEC includes a heat exchanger 32, a first MEA cell 5, and a second MEA cell 6. Electrodes 20 and 24 are configured on opposite sides of a membrane 23 to form the first MEA cell 5 and electrodes 16 and 22 sandwich a membrane 25 to form the second MEA cell 6. Membranes 23 and 25 are ion conductive membranes, preferably proton conductive membranes, having a thickness on the order of approximately 0.1 µm to 500 µm, and more preferably between approximately 1 µm and 500 µm. More particularly, the membranes 23 and 25 are preferably made from a proton conductive material, and more preferably a polymer or ceramic proton conductive material.

The JTEC device is a closed system. Thus, the proton conductive membranes are not exposed to water vapor and hydrocarbon reformation by-products. The pure hydrogen working environment allows the use of low cost, high performance membrane materials that are not viable for fuel cells. In particular, aliovalent-doped $BaCeO_3$ (BCs) has demonstrated high proton conductivity ($\sim 10$-$2$ $Scm$-$1$ at 700° C.). However, the material's poor chemical stability to SOFC by-products, such as $H_2O$ and $CO_2$, restricted them from being considered for proton conducting SOFCs. Use of BCs to achieve these higher conductivity levels is practical for the JTEC because it uses pure hydrogen.

In one embodiment, the membranes 23 and 25 are preferably phosphoric acid doped polybenzimidazole (PBI Performance Products, Inc.; 9800-D Southern Pine Boulevard; Charlotte, N.C. 28273; United States). The phosphoric acid doped PBI material targeted for the low temperature MEA stack has been measured to have conductivity at room temperature of 0.01 S/cm and reached as high as 0.26 S/cm at 200° C. by Xaio. This material exhibits high proton conductivity over a broad temperature range. However, it will be understood by those skilled in the art that any material, and preferably any polymer, ceramic or other material which demonstrates proton conductivity over a range of temperatures may be used to form the membranes 23 and 25. The selected membrane materials 23 and 25 preferably form high barriers to molecular working fluid flow and provide for effective containment of the working fluid.

Electrodes 16, 20, 22 and 24 are preferably thin electrodes having a thickness on the order of approximately 10 µm to 1 cm, and more preferably approximately 50 µm to 1,000 µm. The use of electrodes and membranes made of materials that are significantly different from each other could result in very high thermal stresses due to differences in the thermal expansion coefficients between the materials. Accordingly, the electrodes 20 and 24 are preferably comprised or formed of the same material as the membrane 23 and the electrodes 16 and 22 are preferably comprised or formed of the same material as the membrane 25. However, the electrodes are preferably porous and seeded with a catalytic material and an electronic conductive material, while the membranes are preferably non-porous pure ion conductive material. Because similar basic material compositions are preferably used for the electrodes as for the bulk membranes, the high thermal stresses that would otherwise occur under the extreme temperatures encountered during many end-use applications are eliminated or at least reduced. However, it will be understood that the first and second MEA cells 5 and 6 may be different from each other in that they may be formed using different ion conductive materials, depending on the intended design operating temperature of the individual MEA cell.

The length 33 of the MEA is preferably between approximately 0.25 cm and 10 cm. The width (depth into the drawing) of the MEA is preferably between approximately 1 cm and 100 cm. However, it will be understood by those skilled in the art that the dimensions of the MEA may vary and be selected as appropriate depending on the application in which the MEA is to be used. It is further understood that although a single low temperature MEA and a single high temperature MEA are shown in the figures, they are representative. The low and high temperature MEA may actually be a stack or an array of MEAs having appropriate electrical and working fluid flow conduit interconnects needed to meet the requirements of a given application.

The JTEC further comprises a conduit system including at least one low pressure conduit 36 and at least one high pressure conduit 34. A supply of an ionizable gas, preferably hydrogen, is contained within the conduit system as the working fluid. The high pressure conduit 34 extends through the heat exchanger 32 and couples the high pressure working fluid flow 26 between the high pressure electrode 24 of the first MEA cell 5 and the high pressure electrode 16 of the second MEA cell 6. Similarly, the low pressure conduit 36 couples low pressure working fluid flow 12 between the low pressure electrode 22 of the second MEA cell 6 and the low pressure electrode 20 of the first MEA cell 5 through the heat exchanger 32. Counter flow heat exchanger 32 transfers heat Q from high temperature, low pressure working fluid leaving MEA 6 to low temperature, high pressure working fluid leaving MEA 5. As such the high pressure working fluid in conduit 34 enters high temperature MEA 6 at a temperature that is near that of working fluid leaving MEA 6 in low pressure 36. Similarly, low pressure working fluid in conduit 36 enters low temperature MEA 5 at a temperature that is near that of working fluid leaving MEA 5 in high pressure conduit 34.

The low pressure conduits 36 and high pressure conduits 34 define low and high pressure sides of the JTEC engine. The high pressure side may be at a pressure of as low as 0.5 psi and as high as 3,000 psi. Preferably, the high pressure side is maintained at a pressure of approximately 300 psi or higher. The low pressure side of the JTEC may be at a pressure of as low as 0.0001 psi and as high as 5 psi. Preferably, the low pressure side of the MEA stack is maintained at a pressure of approximately 0.1 psi. A preferred pressure ratio of the high pressure side to the low pressure side is 3,000:1.

Using a preferred pressure ratio of 3,000:1, where the MEA stack is a high temperature stack, operating at a temperature of 523K, the high temperature MEA stack would have a Nernst voltage of approximately 180 mV. On the other hand, if one maintains operation of the first MEA cell 5 at a relatively low temperature of 318K, the low temperature MEA cell 5 would have a Nernst voltage of approximately 110 mV. In this case, the open circuit voltage of the convertor would be approximately 70 mV (i.e., 180 mV-110 mV).

The electrical potential due to a hydrogen pressure differential across a proton conductive MEA is proportional to the natural logarithm of the pressure ratio and is predicted by the Nernst equation [1].

$$V_{OC} = \frac{RT}{2F}\ln(P_H/P_L) \quad \text{Equation 1}$$

In Equation 1, VOC is open circuit voltage, R is the universal gas constant, T is the cell temperature, F is Faraday's constant, $P_H$ is the pressure on the high pressure side and $P_L$ is the pressure on the low pressure side and the pressure ratio is $P_H/P_L$.

Figure 3:
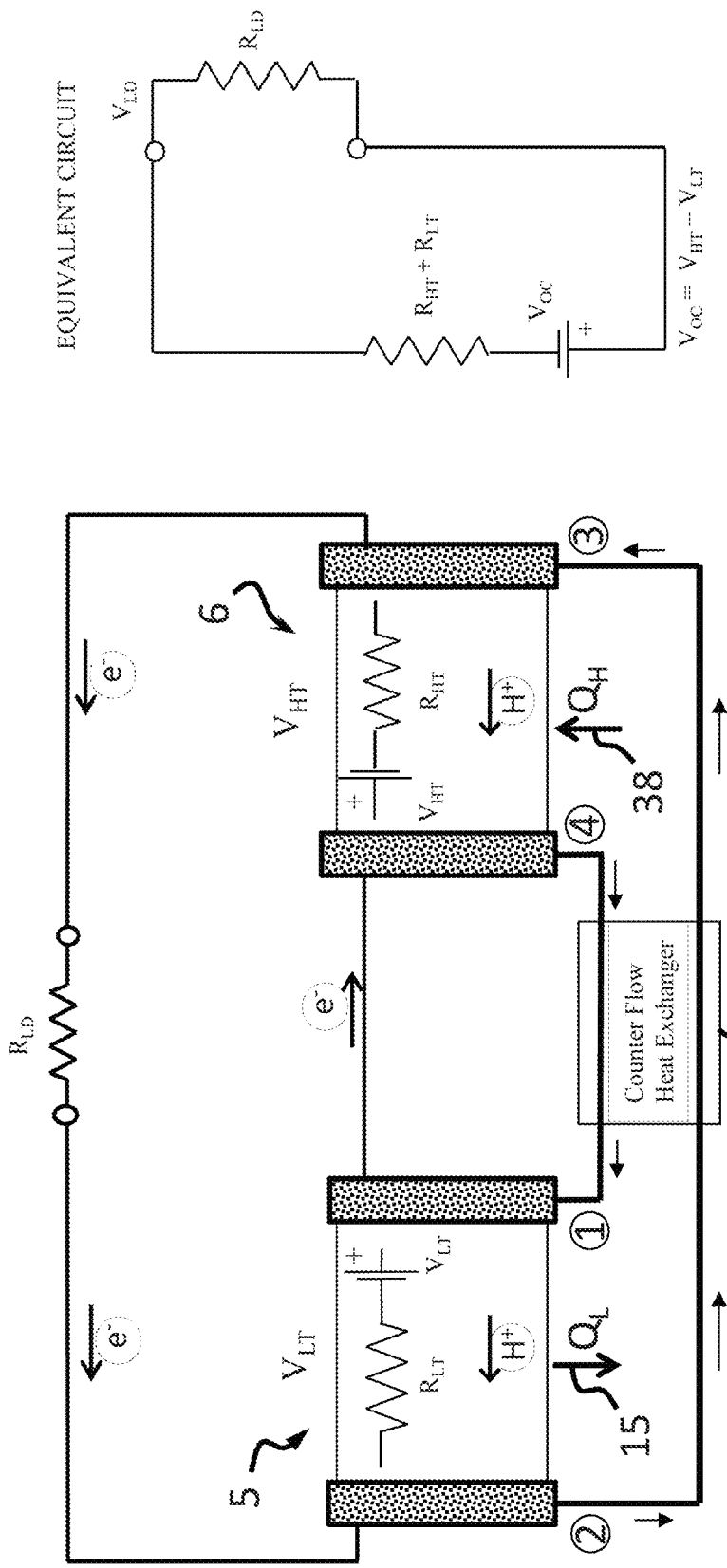
FIG. 3 is an electrical schematic of a JTEC in accordance with an embodiment of the present invention.

FIG. 3 is an electrical schematic that is representative of the JTEC. Each MEA stack 5, 6 is represented as a voltage source and internal impedance. The circuit connects voltage sources back to back such that the larger voltage determines direction of current flow and the difference in voltage and the total circuit impedance determines the magnitude current flow. The back to back connection forces reverse current through the low voltage MEA stack 5 to drive hydrogen from low pressure to high pressure as the hydrogen expands from high pressure to low pressure in the high voltage MEA stack 6. $R_{LT}$ denotes resistance of the low temperature MEA and $V_{LT}$ denotes Voltage of the low temperature MEA. $R_{HT}$ denotes resistance of the high temperature MEA and $V_{HT}$ denotes Voltage of the high temperature MEA. H$^+$ denotes proton conduction and e$^-$ denotes electron conduction. $H_2$ denotes hydrogen flow. $V_{LD}$ denotes voltage applied to a load and $R_{LD}$ denotes load resistance.

Figure 4:
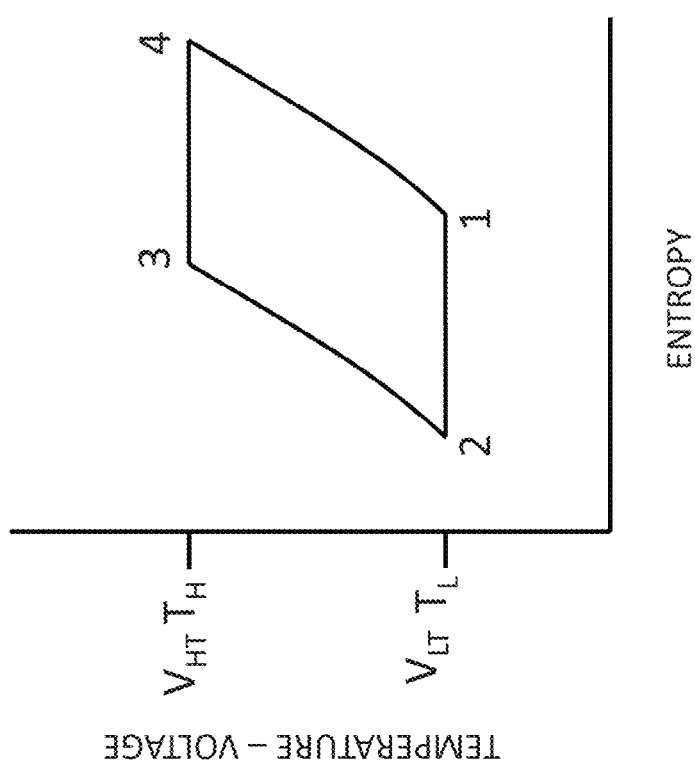
FIG. 4 shows a temperature entropy diagram for an ideal heat engine operating on the Ericsson thermodynamic cycle.

FIG. 4 shows a temperature entropy diagram for an ideal heat engine operating on the Ericsson thermodynamic cycle. The thermodynamic states 1 through 4 of the hydrogen working fluid are identical at the respective points labeled in FIGS. 1, 3 and 4. The numbers identifying parts in FIGS. 1, 3 and 4 refer to equivalent counterpart components in each figure.

Referring to FIGS. 1, 3 and 4, beginning at low temperature, low pressure state 1, electrical energy is supplied to the low temperature MEA to pump hydrogen from low pressure state 1 to high pressure state 2. The temperature of the hydrogen is maintained nearly constant by removing heat $Q_L$ from the proton conductive membrane during the compression process. The thin membrane (preferably less than 100 μm thick) will not support a significant temperature gradient, so the near isothermal assumption for the process is valid, provided adequate heat is transferred to the membrane and its substrate. From state 2, the hydrogen passes through the recuperative, counter flow heat exchanger. It is heated under approximately constant pressure to high temperature state 3 and then flows to the high temperature MEA stack. The heat needed to elevate the temperature of the hydrogen from state 2 to 3 is transferred from hydrogen flowing in the opposite direction in the heat exchanger. At the high temperature MEA stack, electrical power is generated as hydrogen expands from high pressure state 3 to low pressure state 4. Heat $Q_H$ is supplied to the MEA stack to maintain a near constant temperature as the hydrogen expands. From state 4 to state 1, hydrogen flows through the recuperative heat exchanger wherein its temperature is lowered in a constant pressure process by heat transfer to working fluid passing from state 2 to 3. The cycle continues as hydrogen is pumped by the low temperature MEA from low pressure to high pressure.

The voltage generated by the high temperature MEA stack 6 is sufficient to supply pumping power to the low temperature MEA stack 5 for hydrogen compression as well as provide net output power from the system. The working relationship between the two stacks 5, 6 is essentially that of the compressor and power stages of an engine. The high and low temperature MEA stacks 5, 6 are designed to achieve sufficient heat transfer to approximate near constant temperature expansion and compression processes. This feature coupled with the use of the recuperative counter flow heat exchanger 32 allows the engine to approximate the Carnot equivalent Ericsson thermodynamic cycle which is characterized by constant temperature expansion 3-4 and compression 1-2 processes and constant pressure increase in temperature, 2-3, and constant pressure decrease in temperature, 4-1, processes. As illustrated in FIGS. 3 and 4, the net open circuit voltage of the system is the high temperature MEA voltage less the voltage of the low temperature MEA stack 5, and is consistent with the Carnot equivalent Ericsson thermodynamic cycle. Less than optimum operation where the working fluid expansion temperature within stack 6 and the compression temperature within stack 5 are not maintained nearly constant can be useful. Useful compression temperatures and useful expansion temperatures may be employed where the average expansion temperature is greater than the average compression temperature resulting in a net higher average expansion voltage than compression voltage and thereby net positive power output.

Figure 2:
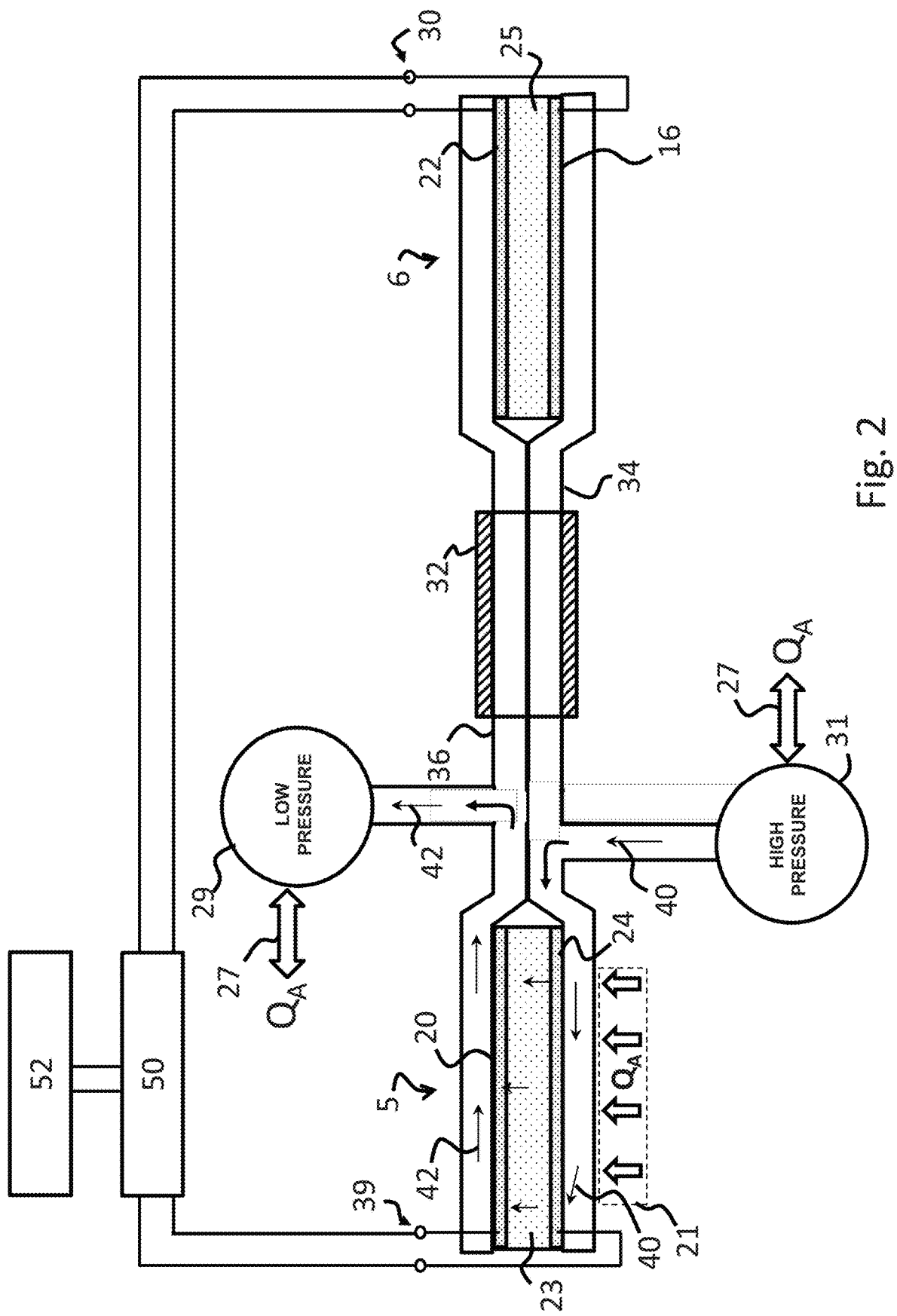
FIG. 2 is a diagram of a JTEC including two MEAs connected back to back by a recuperative heat exchanger and having reservoirs to store ionizable working fluid at high and low pressure in accordance with an embodiment of the present invention, wherein the JTEC is operating to generate power from energy stored in the form of compressed working fluid.

In one embodiment, as shown in FIGS. 1-2, the JTEC further includes a low pressure working fluid storage reservoir 29 coupled to the low pressure conduit 36 and a high pressure working storage reservoir 31 coupled to the high pressure conduit 34.

The second MEA cell 6 is preferably coupled to an elevated temperature heat or thermal energy source 38 and the first MEA cell 5 is preferably coupled to a heat sink 15 which operates at a temperature below the elevated temperature of the second MEA cell 6 and the heat source 38. As such, the second MEA cell 6 is a high temperature MEA stack and the first MEA cell 5 is a low temperature MEA stack. The low temperature MEA stack 5 may operate in the range of −50° C. to 1,500° C., preferably approximately 55° C. However, the operating temperature of the low temperature MEA stack 5 must be sufficiently high so as to have a temperature differential for effective heat removal from it by a heat sink 15, such as ambient temperature air, water or other suitable heat sink in its environment. The high temperature MEA stack 6 may operate at temperatures from −50° C. to as high as 1,500° C., preferably approximately 550° C. It is understood from Carnot that, for a heat engine generating power, the higher the temperature difference between the two stacks, the greater the engine's theoretical conversion efficiency.

Still referring to FIG. 1, power is generated as pressure forces the working fluid through the second MEA cell 6. The power is supplied to second terminal 30 at the Nernst voltage of the second MEA cell 6 based on the applied pressure differential and its temperature less the voltage loss due to the internal impedance of the MEA cell 6. Under the force of pressure, electron current 35 is conducted through terminal 30 as ions 37 are conducted through the ion conductive membrane 25. Under pressure, the working fluid oxidizes at the second high pressure electrode 16. Electrons are released to the electrode 16 as ions of the working fluid enter and flow through the ion/proton conductive membrane 25 as indicated by arrows 37. Electrons 35 returning to the terminal 30 are coupled to the low pressure electrode 22, where ions/protons exiting the membranes 25 are reduced to reconstitute the working fluid on the low pressure side. The heat source 38 is coupled to the second MEA cell 6 to supply heat of expansion to the working fluid so as to maintain a continuous and nearly isothermal expansion process.

A portion of the power produced by the second MEA cell 6 is supplied to the first MEA cell 5 by connection to terminal 39. Terminal 39 is connected to the first high pressure electrode 24 and the first low pressure electrode 20. Working fluid flow is pumped from low pressure to high pressure as the electron current flow 41 forced under the power applied to terminal 39 induces ion conductivity through the ion conductive membrane 23 of the first MEA cell 5. Electrical power is consumed by the compression process. Voltage is applied to the first terminal 39 at a potential that is sufficient to force current flow by overcoming the Nernst potential generated by the first MEA cell 5 at its operating temperature and pressure differential. The applied power strips electrons from the working fluid at the interface of the low pressure electrode 20 and membrane 23. The resulting ions are conducted through the ion conductive membranes 23 in the direction indicated by arrows 43. Electrons 41 are supplied to the high pressure electrode 24 via the terminal 39, so as to reconstitute the working fluid at the interface of the high pressure electrode 24 and membrane 23 as ions exit the membrane 23. This current flow under the applied voltage, in effect, provides the pumping power needed for pumping the working fluid from low pressure to high pressure. The heat sink 15 is coupled to the MEA cell 5 to remove the resulting heat of compression, so as to maintain a near constant temperature continuous compression process.

The energy storage JTEC further includes a controller 50 and a load 52, as well as the high pressure working fluid reservoir 31 and the low pressure working fluid pressure reservoir 29. The controller 50 is connected to the load 52, the low temperature MEA stack 5 and the high temperature MEA stack 6. The controller 50 operates to extract power produced by the high temperature MEA stack 6 with the expansion of working fluid. The controller supplies power to the low temperature MEA cell 5 so that it can maintain a continuous supply of pressurized working fluid to the high temperature MEA cell 6. Power that is not supplied to the low temperature MEA cell 5 is supplied to the external load 52 to meet load demand. When power produced by the high temperature MEA stack 6 is in excess of that needed to power the load 52 and to sustain the compression of working fluid by the low temperature MEA cell 5, the excess power is supplied to the low temperature MEA cell 5 for compression of an excess amount of working fluid. The surplus power is stored as compressed working fluid by pumping additional working fluid from low pressure reservoir 29 to high pressure reservoir 31 as indicated by arrows 42 and 40. Working fluid flow 10 includes low pressure flow 12 from the high temperature MEA stack 6 plus low pressure working fluid extracted from reservoir 29. Similarly, high pressure flow 14 includes high pressure flow to the high temperature MEA stack 6 as well as high pressure flow to reservoir 31.

FIG. 2 depicts operation of the JTEC when the high temperature heat source is not available. Under this condition, the supply of power to the load 52 is sustained by using the first MEA cell 5 to extract the energy stored in reservoir 31 as pressurized working fluid. As illustrated by arrows 40, the working fluid leaves the high pressure reservoir 31 and flows to the first MEA cell 5. The working fluid then enters electrode 24 and expands through the first MEA cell 5 to the low pressure conduit 36. A relatively constant expansion temperature within MEA 5 is maintained by heat supplied by source 21. The working fluid then flows on to the low pressure reservoir 29 as indicated by arrows 42. The storage reservoirs 31 and 29 are configured to thermally couple heat to and from heat sources $Q_A$ as indicated by arrows 27 so as to maintain relatively stable operating temperatures so that their respective high and low operating pressure regions can be maintained as hydrogen expands and compresses as it exits and enters the reservoirs. The heat sink and source $Q_A$ may be a single source such as the ambient environment.

As illustrated in FIG. 1, heat is transferred to heat sink 15 as hydrogen is compressed by the first MEA cell 5, so as to maintain a constant temperature compression process. On the other hand, as illustrated in FIG. 2, heat is transferred to the first MEA cell 5 as hydrogen is expanded through the first MEA cell 5 when operating on stored hydrogen pressure energy so as to maintain a relatively constant temperature expansion process. As such, the heat sink 15 and heat source 21 may be separate sources and sinks or a single heat sink/source, which may be the ambient environment. By operating in this manner, the JTEC stores energy that is produced in excess of that needed at a given time by the load as compressed working fluid. It can extract the energy, as needed, and thereby address the need for a practical, cost effective electrical power source that operates on heat and that can effectively respond to energy demand profiles in a manner that is independent of the limitations of its primary heat energy source profile.

In another embodiment, the storage reservoirs 29 and 31 may be configured as having a metal hydride material inside so as to improve the capacity of hydrogen that can be stored at a given pressure and volume. Metal hydrides are metallic substances that are capable of absorbing hydrogen gas when exposed to the hydrogen gas at certain pressures and temperatures. The terminology used in discussing metal hydrides is sometimes confusing. A primary reason for the confusion is that the term metal hydride can be used to refer to the hydrogen-absorptive material both before and after it has absorbed hydrogen. Therefore, for purposes of explanation herein, the pre-absorption material generally will be referred to as "metal hydride" or "metal-hydride material," or, simply, "hydride." After the metal hydride, or metal-hydride material, has absorbed hydrogen gas, for clarity, the resulting product is sometimes referred to herein as a hydrogen-ladened metal-hydride." The "hydrogen-ladened" adjective is not used where, from the context, the state or condition of hydrogen absorption is clear. In the hydrogen-ladened metal hydride, hydrogen is distributed throughout the metal-lattice structure of the metal hydride. The metal-hydride material is typically provided in a crushed or other configuration that maximizes the surface area to be contacted by hydrogen gas.

Ideally, if the pressure of the hydrogen gas rises above the equilibrium pressure, then hydrogen will be absorbed into the metal hydride. Absorption is exothermic since heat will be released during the process. If sufficient heat is not transferred away from the metal hydride to support continued hydrogen absorption at a stable temperature, then the temperature will increase to a point where a new, higher equilibrium pressure state is attained and absorption will cease. On the other hand, if the pressure of hydrogen gas drops below the equilibrium pressure, hydrogen gas will be released from the hydrogen-ladened metal-hydride material. Desorption is endothermic since heat will be absorbed during the process. If sufficient heat is not transferred to the metal hydride to support continued hydrogen desorption at a stable temperature, then the temperature will decrease to a point where a new, lower equilibrium pressure state is attained and desorption will cease. Operation is such that heats of absorption and desorption can be exchanged with the reservoirs' environment so that relatively stable absorption and desorption pressures can be maintained.

Figure 5:
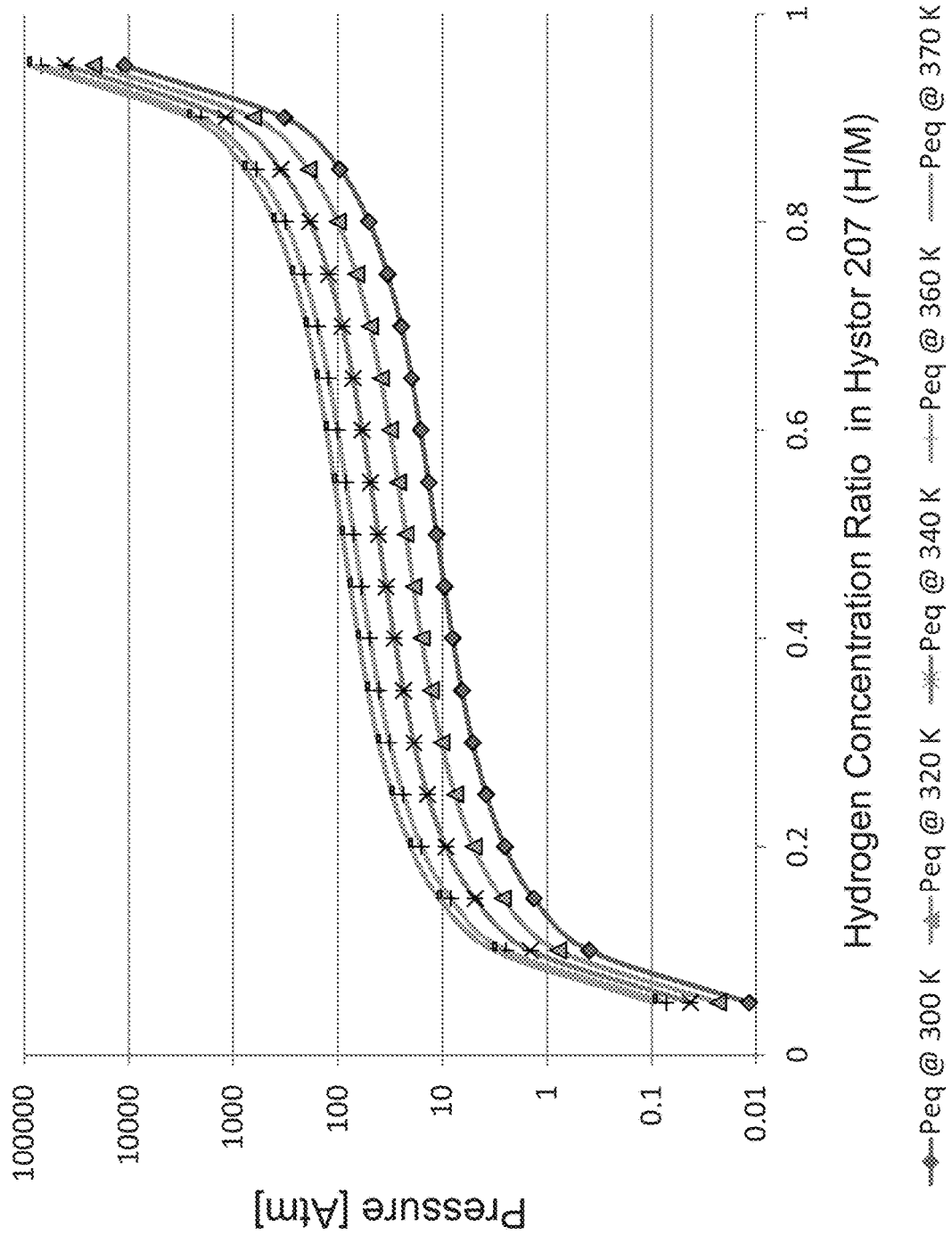
FIG. 5 is a graph showing plots of hydrogen pressure plateaus versus concentration ratio for Hystor 207 at selected temperatures.

Referring now to FIG. 5, a data plot shows the pressure and temperature relationship versus hydrogen content for an example metal hydride. This particular chart is for a metal hydride commercially marketed as Hy-Stor®207 that has a chemical formula $LaNi_{4.7}Al_{0.3}$. The product is believed to be sold and distributed by Hera USA Inc., a Delaware Corporation, having a contact address at C/O Corporation Svc. Company, 2711 Centerville, Road Suite 400 Wilmington Del. 19808. H/M, the quantity along the x-axis, is the amount of hydrogen in the metal hydride as a ratio to the maximum amount of hydrogen that the hydride can absorb. As can be seen from the data plot, metal hydrides exhibit pressure plateaus that are a function of temperature whereby, at a given temperature, the majority of the hydrogen is stored with minimal increase in pressure. The pressure level of the plateau increases with increasing temperature. The "midpoint pressure" for a given temperature is defined as the pressure at which the hydride contains 50% (0.50) of its storage capacity. The midpoint pressure may be used as a representative value for comparison of plateau pressures of different hydrogen-ladened metal-hydride materials at a given temperature.

Figure 6:
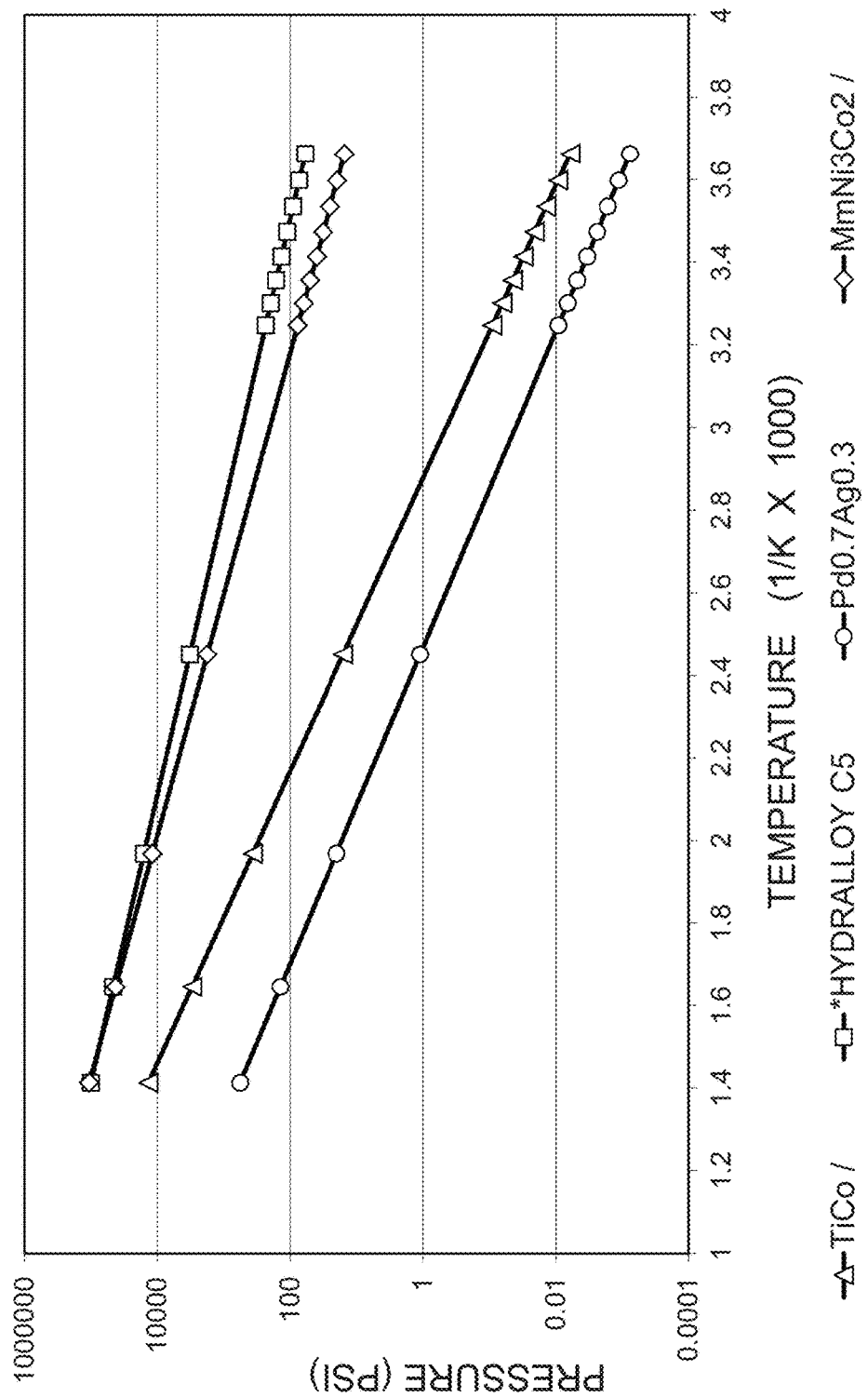
FIG. 6 is graph showing metal hydride plateau midpoint pressure data versus temperature for selected metal hydrides, TiCo, $Pd_{0.7}Ag_{0.3}$ and $MmNi_3Co_2$.

Referring now to FIG. 6, therein is shown plots of the variation of the midpoint pressure versus temperature for several selected commercially available metal hydrides. The name Hydralloy.RTM.C5 is a trademark for the metal hydride having chemical formula: $Ti_{0.98}Zr_{0.02}V_{0.43}Fe_{0.09}Cr_{0.05}Mn_{1.5}$. The product is believed to be sold and distributed by GfE Gesellschaft fur Elektrometallurgie mbH Ltd Liab Co, Fed Rep Germany, Hofener Strasse 45, 8500 Nurnberg 1 Fed Rep Germany, a subsidiary of AMG Advanced Metallurgical Group N.V., Netherlands. FIG. 6 highlights the fact selected metal hydrides can be paired together as high-pressure and low-pressure beds for optimum performance in the energy storage JTEC application.

The hydrogen-release process is endothermic. Heat input is required to maintain the desorption process and, conversely, the absorption process is exothermic as heat rejection is required in order to maintain the absorption process. The example given here is for instructive purposes only and does not include detailed physical effects, such as hysteresis, slope of the pressure vs. hydrogen concentration line, or the concentration limits of the actual plateau region. The analysis is also ideal in that it does not consider real world losses associated with effects such as parasitic heat losses, heat transfer temperature gradients and material heat capacities.

Figure 7:
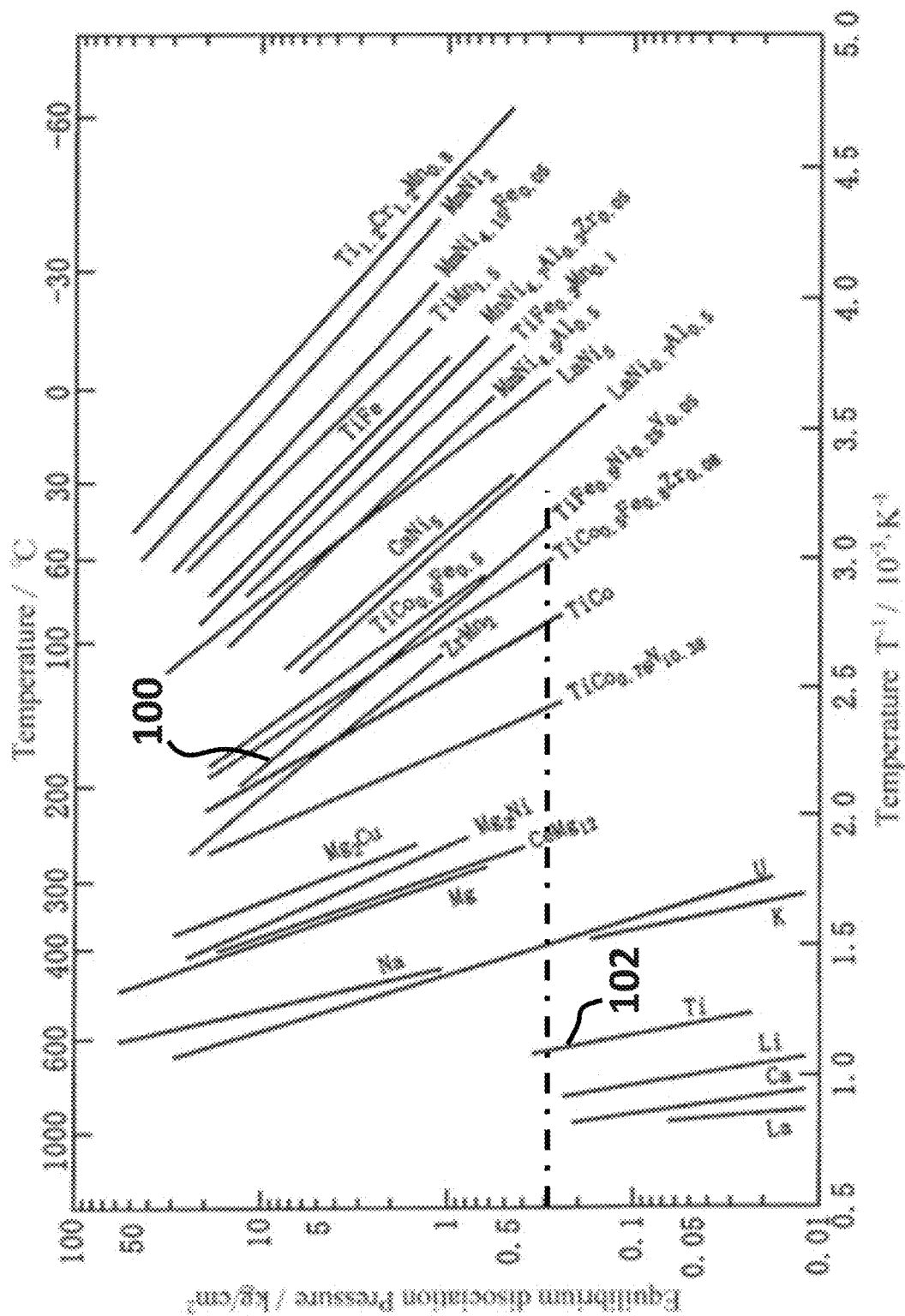
FIG. 7 is a graph showing plots of hydrogen pressure plateaus versus temperature.

Referring to line 102 in FIG. 7, $TiH_2$ is a suitable metal hydride for the high temperature reservoir. Referring to line 100 in FIG. 7, $TiFe_{0.5}Ni_{0.25}V_{0.05}H_2$ is suitable for the low temperature reservoir. As can be seen from the graph, $TiH_2$ has a plateau pressure at approximately 0.29 kg/cm$^2$ at 930K (657° C.). On the other hand, $TiFe_{0.5}Ni_{0.25}V_{0.05}H_2$ has a plateau pressure at approximately 0.29 kg/cm$^2$ at 320K (47° C.). Since both metal hydride reservoirs are essentially at the same pressure at their respective temperatures, they will naturally maintain pressure equilibrium state and essentially no work is performed when hydrogen is free to migrate between the two.

In practice, for a given material, the equilibrium pressures and temperatures for absorption are different from the equilibrium pressures and temperatures for desorption by finite amounts. This difference is generally referred to as the hysteresis property of the material and must be accounted for by appropriately selecting metal hydrides for use in the energy storage JTEC. As discussed, the hydrogen-release process is endothermic since heat input is required to maintain the desorption process and, conversely, the absorption process is exothermic as heat rejection is required in order to maintain the absorption process.

Figure 8:
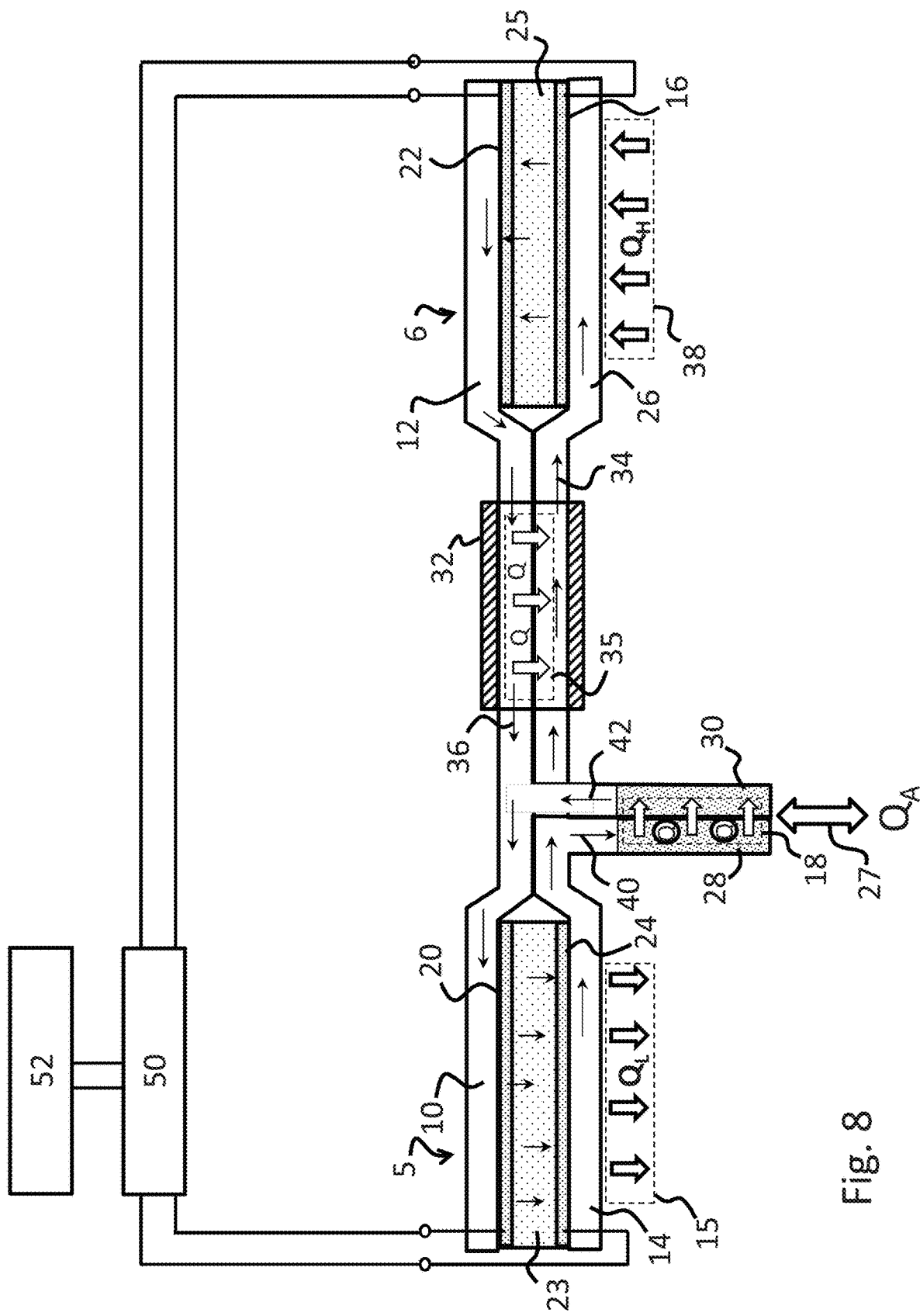
FIG. 8 is a schematic of a JTEC including two MEAs coupled back to back and having the capacity to store hydrogen using high and low pressure metal hydride storage media wherein the high and low pressure storage media are thermally coupled to each other in accordance with an embodiment of the present invention, wherein the JTEC is operating on heat from a primary source to generate power and store energy as compressed working fluid using metal hydrides.
Figure 9:
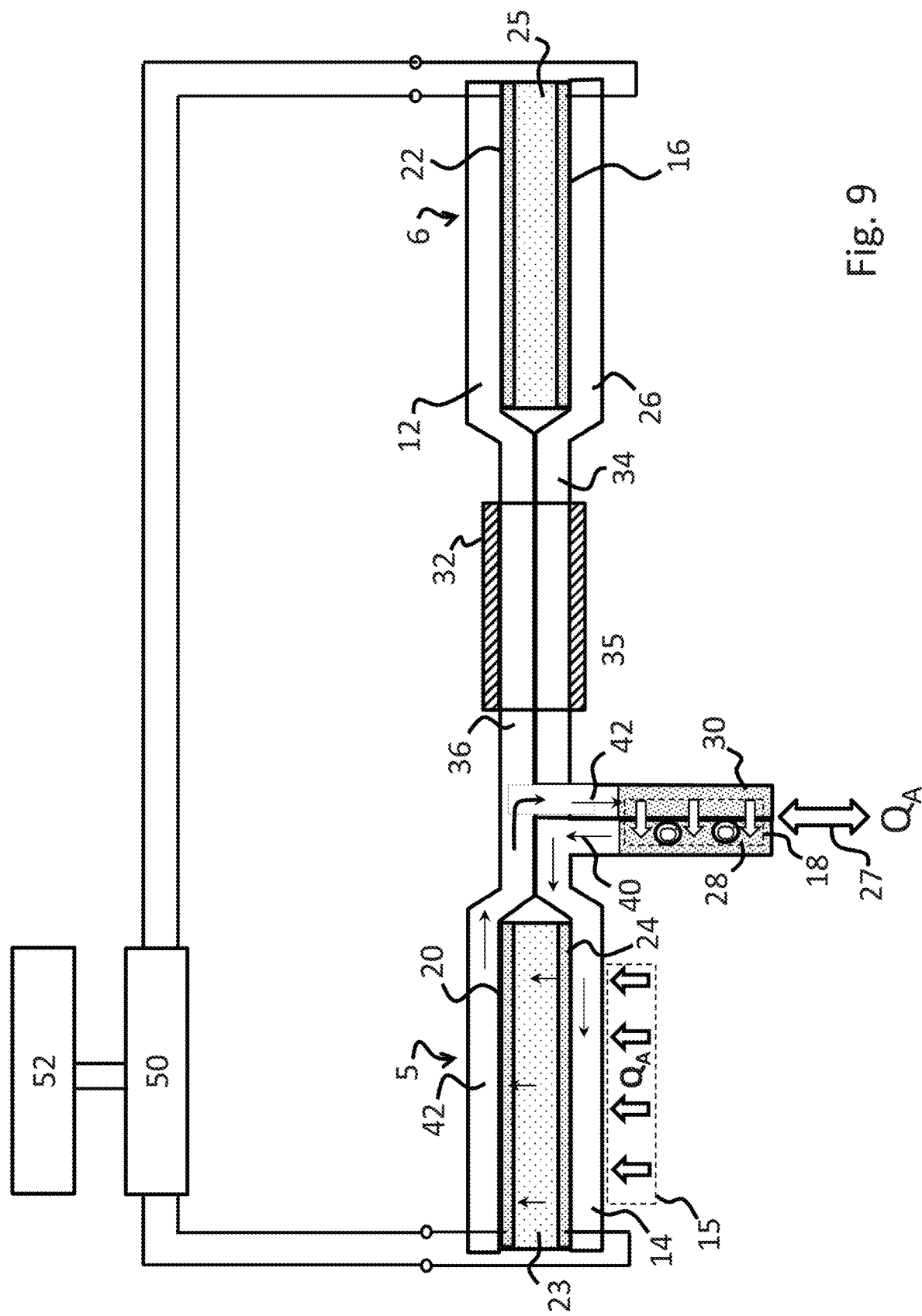
FIG. 9 is a schematic of a JTEC including two MEAs coupled back to back and having the capacity to store hydrogen using high and low pressure metal hydride storage media wherein the high and low pressure storage media are thermally coupled to each other in accordance with an embodiment of the present invention, wherein the JTEC is operating to generate power from energy stored in the form of compressed working fluid using metal hydrides.

FIGS. 8 and 9 illustrate a configuration employing metal hydrides to store hydrogen wherein the storage vessels are thermally coupled to each other such that the heat of absorption/desorption 18 is transferred between the storage media to maintain relatively stable pressure ratios. Heat transfer 27 between the storage vessel and a heat sink/source $Q_A$ in its environment is maintained to account for the differences in the respective heats of absorption/desorption of the hydrogen storage materials as hydrogen is cycled between the two.

Operation of the energy storage JTEC illustrated in FIGS. 8 and 9 is essentially the same as that of the JTEC illustrated in FIGS. 1 and 2. Referring to FIG. 8, when power produced by the high temperature MEA stack 6 is in excess of that needed to sustain the supply of compressed working fluid from the low temperature MEA stack 5 to the high temperature MEA stack 6 and supply power to load 52, the excess power is supplied to the low temperature MEA stack 5 for compression of an excess amount of working fluid. As represented by arrows 42 and 40, respectively, surplus power is stored as compressed working fluid by pumping additional working fluid from low pressure metal hydride reservoir 30 to high pressure metal hydride reservoir 28. Heat of absorption/desorption 18 released by the exothermic absorption process occurring in reservoir 28 is supplied to reservoir 30 to sustain the endothermic desorption process occurring in reservoir 30.

FIG. 9 depicts operation of JTEC to supply power to load 52 when the high temperature heat source is not available. Under this condition, power to load 52 is sustained by using the low temperature MEA stack 5 to extract the energy of the pressurized working fluid stored in reservoir 28. As illustrated by arrows 40 and 42, now indicating flow in the opposite direction, working fluid leaves high pressure reservoir 28, flows through the low temperature MEA stack 5 and enters low pressure reservoir 30 as indicated by arrows 42. The heat 18 required for the endothermic desorption process occurring in reservoir 28 is supplied by the exothermic absorption process occurring in reservoir 30. By operating in this manner, the JTEC can meet load demand by extracting the stored energy of the compressed working fluid when demand is in excess of the energy that can be generated from operation on the primary heat source alone or when the primary heat source is not available. Note that any difference in the heats of absorption/desorption between the two beds can be extracted or rejected to an external source/sink as indicated by heat flow 27.

Figure 10:
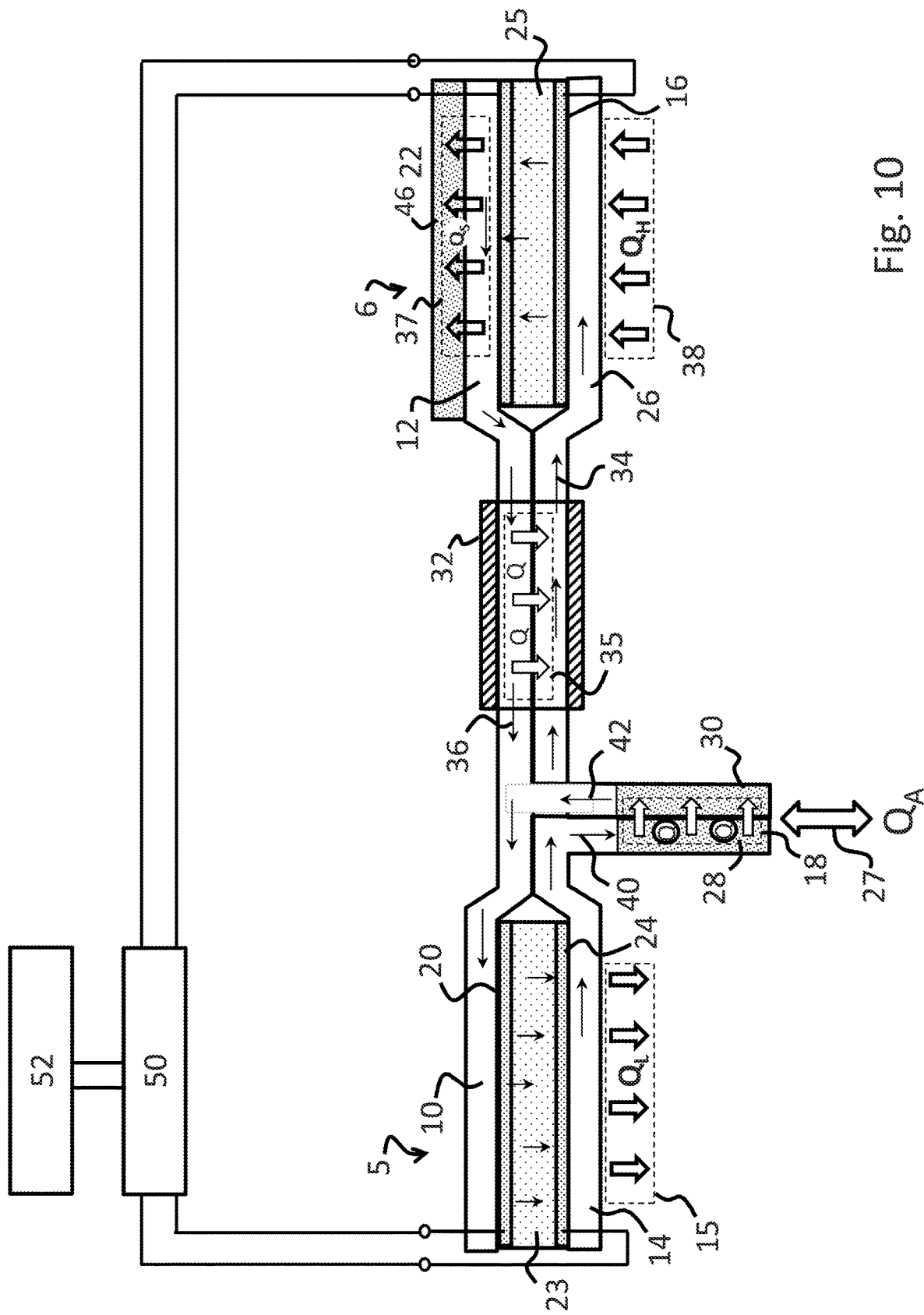
FIG. 10 is a schematic of a JTEC including a heat sink/source material for storing thermal energy in accordance with an embodiment of the present invention, wherein the JTEC is operating on heat from a primary source to generate power and store energy as compressed working fluid and heat.

In another embodiment, the invention may be configured to include a heat storage capability. Referring to FIG. 10, thermal storage reservoir 46 contains high heat capacity material. During operation when heat from primary heat source 38 is available, portion $Q_S$ of the available heat is supplied to the heat storage medium with in reservoir 46. Excess heat 37 supplied to the high temperature MEA stack 6 that is not consumed in maintaining the constant temperature of the hydrogen expansion process, is stored within reservoir 46. In addition, when power produced by the high temperature MEA stack 6 is in excess of that needed to sustain the supply of compressed working fluid from the low temperature MEA stack 5 to MEA 6 and supply power to load 52, the excess power is supplied to the low temperature MEA stack 5 for compression of an excess amount of working fluid. As represented by arrows 42 and 40 respectively, surplus power is stored as compressed working fluid by pumping additional working fluid from low pressure metal hydride reservoir 30 to high pressure metal hydride reservoir 28. Heat of absorption/desorption 18 released by the exothermic absorption process occurring in reservoir 28 is supplied to reservoir 30 to sustain the endothermic desorption process occurring in reservoir 30.

Figure 11:
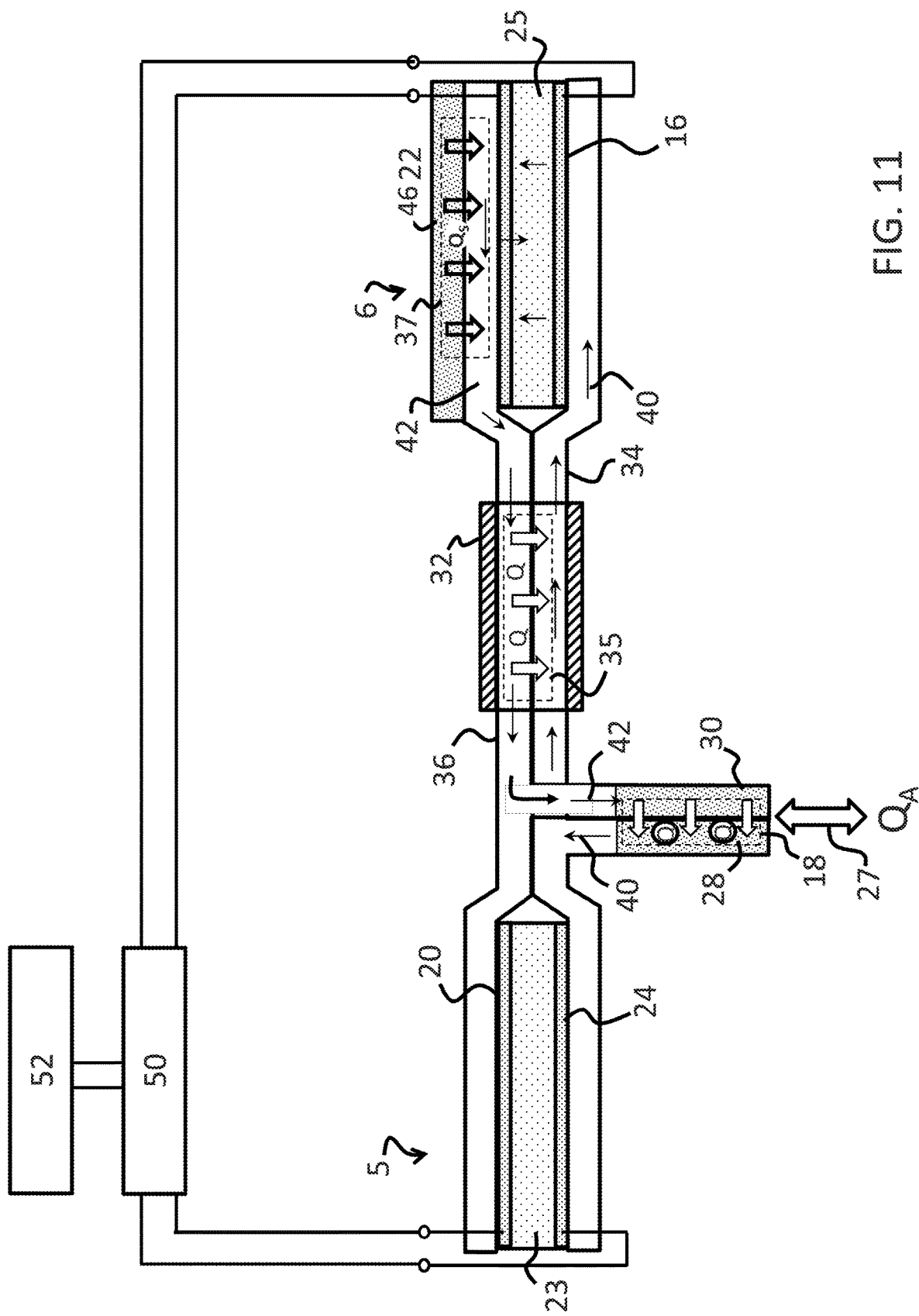
FIG. 11 is a schematic of a JTEC including a heat sink/source material for storing thermal energy in accordance with an embodiment of the present invention, wherein the JTEC is operating to generate power from energy stored in the form of compressed working fluid and heat.

FIG. 11 depicts operation of the convertor to supply power to load 52 when the high temperature heat source is not available. Under this condition, power to load 52 is sustained by using the high temperature MEA stack 6 to extract the energy of the pressurized working fluid stored in reservoir 28 and high temperature heat from reservoir 30. Reservoir 30 supplies heat to maintain the temperature of the high temperature MEA stack 6 as hydrogen expands through the high temperature MEA stack 6 from metal hydride reservoir 28 to metal hydride reservoir 30. As illustrated by arrows 40, working fluid leaves high pressure reservoir 28, flows through the high temperature MEA stack 6 and enters low pressure reservoir 30 as indicated by arrows 42. The heat 18 required for the endothermic desorption process occurring in reservoir 28 is supplied by the exothermic absorption process occurring in reservoir 30. By operating in this manner, the JTEC can meet load demand by extracting the stored energy of the compressed working fluid when demand is in excess of the energy that can be generated from operation on the primary heat source alone or when the primary heat source is not available. Any difference in the heats of absorption/desorption between the two beds can be extracted or rejected to an external source/sink as indicated by heat flow 27.

Figure 12:
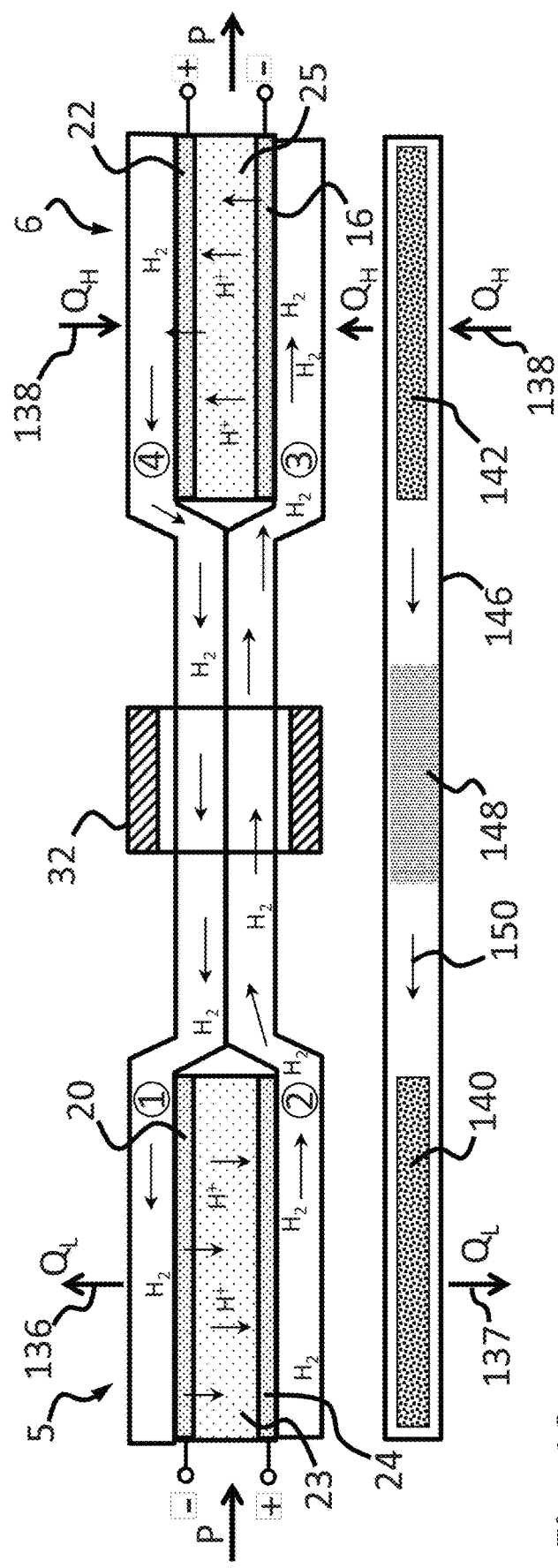
FIG. 12 is an operating diagram of a JTEC in accordance with an embodiment of the present invention, wherein the JTEC is operating on heat from a primary source to generate power and store energy as compressed working fluid and heat.

Referring to FIG. 12, there is shown another embodiment of the energy storage JTEC including two metal hydride reservoirs, 140 and 142. Metal hydride reservoir 142 stores hydrogen nominally at low pressure when at or near ambient temperature. Metal hydride reservoir 142 is coupled to the high temperature MEA stack 6 of the JTEC and heat source 138. On the other hand, reservoir 140 contains a metal hydride that stores hydrogen nominally at a high pressure when at or near ambient temperature. Metal hydride reservoir 140 is coupled to the low temperature MEA stack 5 of the JTEC and heat sink 136. The two reservoirs 140, 142 are coupled to each other by a hydrogen flow conduit 146 which contains a recuperative heat exchanger containing thermal energy storage material 148.

This embodiment enables the JTEC to operate in its nominal continuous mode whereby power is input to the low temperature MEA 5 to compress working fluid and power is extracted from the high temperature MEA 6 with expansion of working fluid. Power is denoted as P in FIGS. 12 and 13. In one embodiment, operation of the metal hydride thermal energy storage system is such that heat source heat input 138 raises the temperature of the low pressure reservoir 142 to its operating temperature at which its pressure exceeds that of the low temperature reservoir 140. The increase causes the high temperature reservoir 142 to release hydrogen which uses heat energy input 138 as a source for latent heat of desorption. The desorbed hydrogen 150 flows to the low temperature reservoir 140. The low temperature reservoir 140 is thermally coupled to heat sink heat output 137 so that its temperature remains relatively constant as it absorbs the hydrogen and releases the latent heat of absorption. Heat sink heat output 137 may be a heat storage medium, ambient air or other medium that can function as both a heat source and heat sink.

Figure 13:
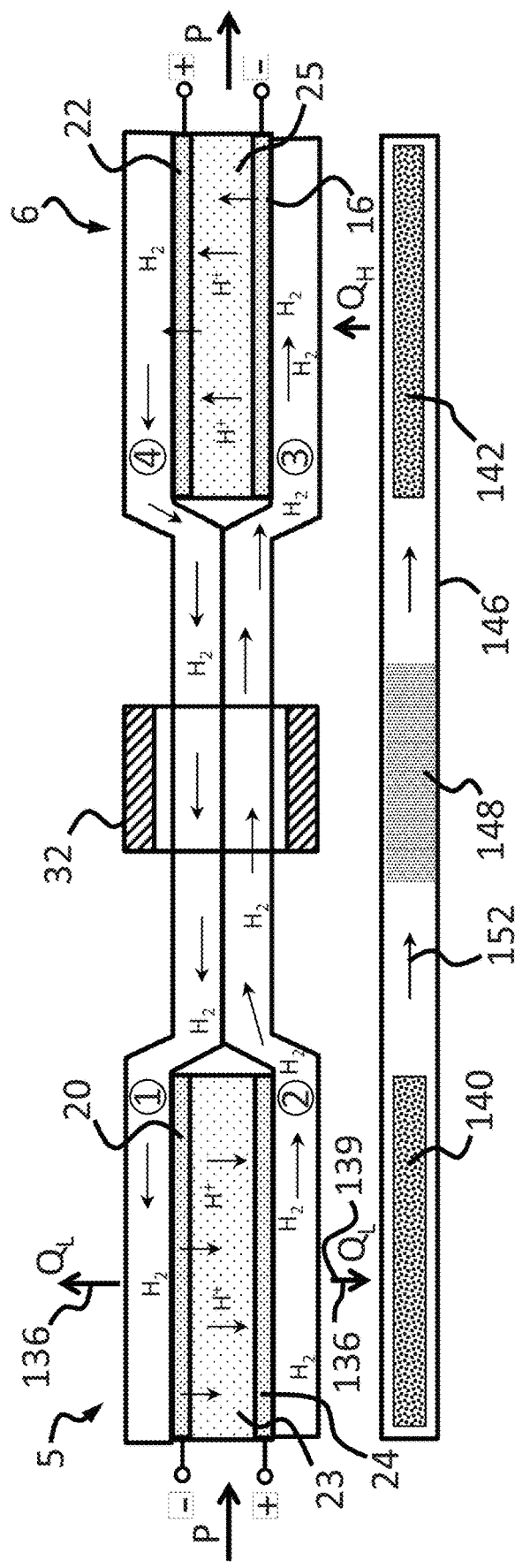
FIG. 13 is an operating diagram of a JTEC in accordance with an embodiment of the present invention, wherein the JTEC is operating to generate power from energy stored in the form of compressed working fluid and heat.

The process operates in reverse when heat source heat input is not available, as illustrated in FIG. 13. A decrease in temperature of the high temperature reservoir 142 causes its pressure to drop below that of the high pressure metal hydride of the low temperature reservoir 140. The hydrogen 152 now leaves the low temperature reservoir 140 extracting latent heat 139 in the process and flows to the high temperature reservoir 142. The latent heat source heat input 139 may be supplied by the low temperature MEA stack 5 or extracted from a heat storage medium, ambient air or other medium that can function as both a heat source and heat sink. Preferably, the latent heat 139 is supplied by low temperature MEA stack 5, thereby assisting in the maintaining stack 5 at a low temperature. The temperature of the high temperature reservoir 142 is maintained as the low pressure metal hydride therein absorbs the hydrogen 152 and releases the latent heat. The released latent heat is supplied to the high temperature MEA stack 6. The metal hydride beds thus maintains an elevated temperature of the high temperature MEA to maintain operation of the JTEC, thereby enabling it to continuously generate power even when input 138 is not available. It is understood that the low temperature MEA stack of the JTEC may reject heat to the heat sink 136 and to low temperature metal hydride 140 or just to heat sink 136.

Figure 14:
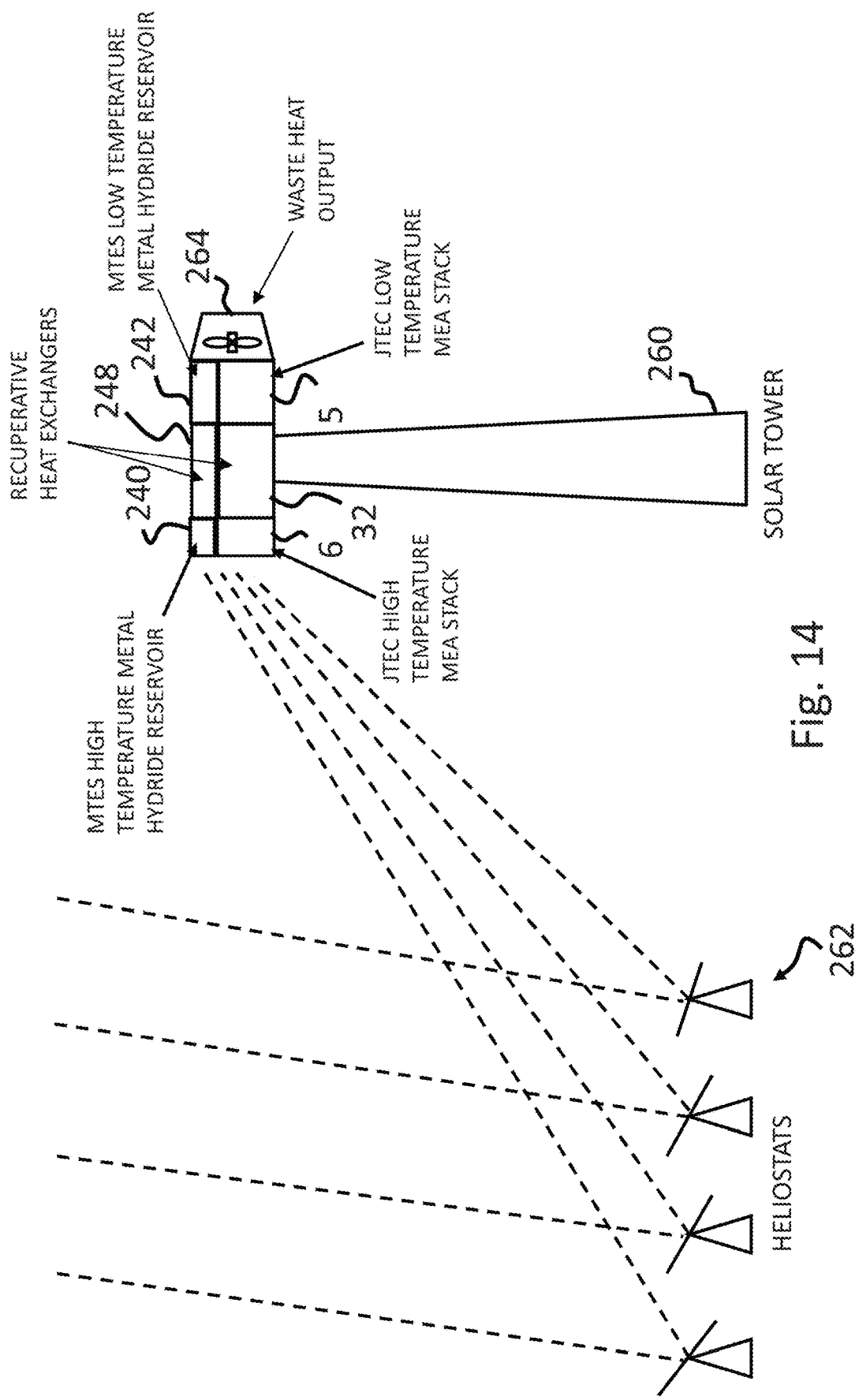
FIG. 14 is a schematic of a JTEC employed for solar energy conversion and storage, in accordance with an embodiment of the present invention.

FIG. 14 shows one preferred embodiment of the present invention, where the JTEC is employed for solar energy conversion and storage. The configuration uses an array of mirrors 262 to concentrate solar energy onto a preferred embodiment of the invention mounted at the top of tower 260. The high temperature MEA stack 6 of the JTEC and high temperature section 240 of the thermal energy storage system are located on the tower at the focal point of the concentrator. The low temperature MEA stack 5 of the JTEC and low temperature section 242 of the thermal energy storage system are located away from the solar array. Recuperative heat exchangers 32 and 248 couple the high and low temperature sections 6 and 5 of the JTEC and sections high and low temperature sections 240 and 242 energy storage system to each other respectively. Low temperature section 242 and MEA 5 are thermally coupled to each other. They are thermally coupled to the environment by a forced convection cooling device 264.

Figure 15:
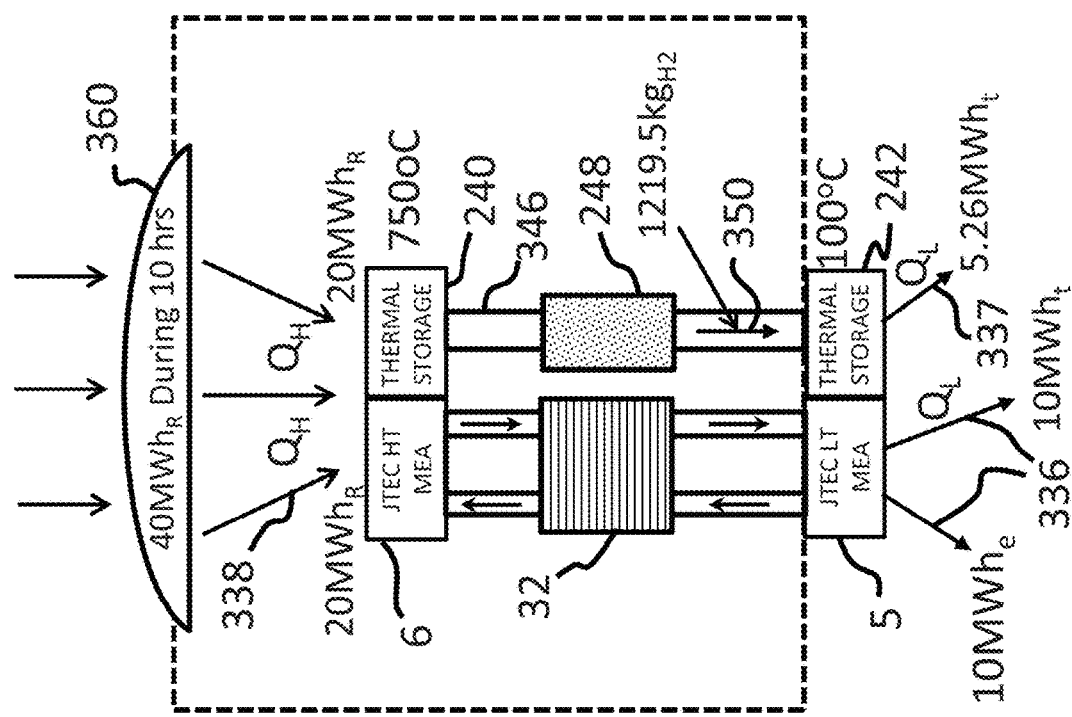
FIG. 15 is an energy balance diagram of a 80% Carnot efficient JTEC conversion system with "ideal" energy storage and heat transfer conditions operating on solar heat input, in accordance with an embodiment of the present invention.

As an example, FIG. 15 shows a functional drawing of a solar energy application according to an embodiment of the present invention. In FIG. 15, $Wh_e$ refers to electrical power (Watts of electricity), $Wh_t$ refers to heat (Watts of heat) and $Wh_R$ refers to solar radiance (Watts of heat radiated). The high temperature JTEC MEA stack 6 operates on solar heat 338 at 750° C. Solar energy is supplied by a concentrator 360. The example is for the JTEC operating at a thermal conversion efficiency of 80% of Carnot, yielding a net a conversion efficiency of 51% at a heat rejection temperature of 100° C., assuming "ideal" heat transfer conditions and metal hydride properties.

The energy balance levels indicated in the diagrams in FIG. 15 are based on the input of 4 MW of solar input over a 10 hour period. Of the 4 MW of concentrated solar heat input, 2 MW is supplied to the JTEC for energy conversion and 2 MW to the metal hydride for thermal storage. The diagram shows operation under conditions of ideal heat transfer conditions with no metal hydride hysteresis. As illustrated in FIG. 15, the solar heat input over a 10 hour heating period results in a total of 40 $MWh_R$ of heat energy input. During the solar radiance period, a total of 10 $MWh_e$ of electrical energy is generated by the JTEC operating in the 50% conversion efficiency range and 10 $MWh_t$ is rejected as waste heat by the JTEC at low temperature MEA stack 5 as indicated by arrows 336.

Also occurring during this period, the high temperature metal hydride reservoir 240 accumulates 20 MWhs of stored thermal energy as heat of desorption. The latent heat of absorption/desorption for the $TiH_2$ is 32.86 kWh/kmole$_{H2}$ of hydrogen. The molar mass of TiH2 is equivalent to 49.9 kg/kmole$_{TiH2}$ of $TiH_2$. On a per kilo-gram basis, the absorption/desorption enthalpy of $TiH_2$ is approximately 658 $Wh_t$/kg$_{Ti}$. The density of Ti is 4.5 g/cm³ which results in a volumetric heat latent capacity for $TiH_2$ of approximately 2.96 $Wh_t$/cm³. Assuming ideal $TiH_2$ with desorption enthalpy of approximately 16.4 kWh$_t$/kg of hydrogen, 6.75 m³ (30,395 kg) of $TiH_2$ will store 20 $MWh_t$ of heat. The amount of hydrogen 350 released and transferred to the low temperature reservoir via conduit 346 is 1219.5 kg$_{H2}$ (609.75 kmoles).

At the low temperature reservoir 242, 57,926 kg$_{MH}$ of $TiFe_{0.5}Ni_{0.25}V_{0.05}H_2$ at 95.0 kg/kmole$_{MH}$ is needed to absorb the 609.75 kmoles$_{H2}$ (1219.5 kg$_{H2}$) of hydrogen 350 released from the $TiH_2$ of high temperature reservoir 240. The density of the $TiFe_{0.5}Ni_{0.25}V_{0.05}H_2$ is 4.89 g/cm³. Therefore, 11.8 m³ of the low temperature metal hydride will be needed for the reservoir 242. With an absorption enthalpy of 90.9 $Wh_t$/kg$_{MH}$, the amount of heat released by the $TiFe_{0.5}Ni_{0.25}V_{0.05}H_2$ will be 5.26 $MWh_t$ which is significantly less than the 20 MWt of heat absorbed by the high temperature $TiH_2$ reservoir with the release of hydrogen 350. The volumetric heat capacity of the low temperature reservoir 242 is 0.444 $Wh_t$/cm³, (90.9 $Wh_t$/kg*4.89 g/cm³). The 5.26 $MWh_t$ of heat of absorption 337 released to the environment by the low temperature reservoir 242 is in addition to the 10 $MWh_t$ of waste heat 336 released by the low temperature MEA stack 5 of the JTEC.

Figure 16:
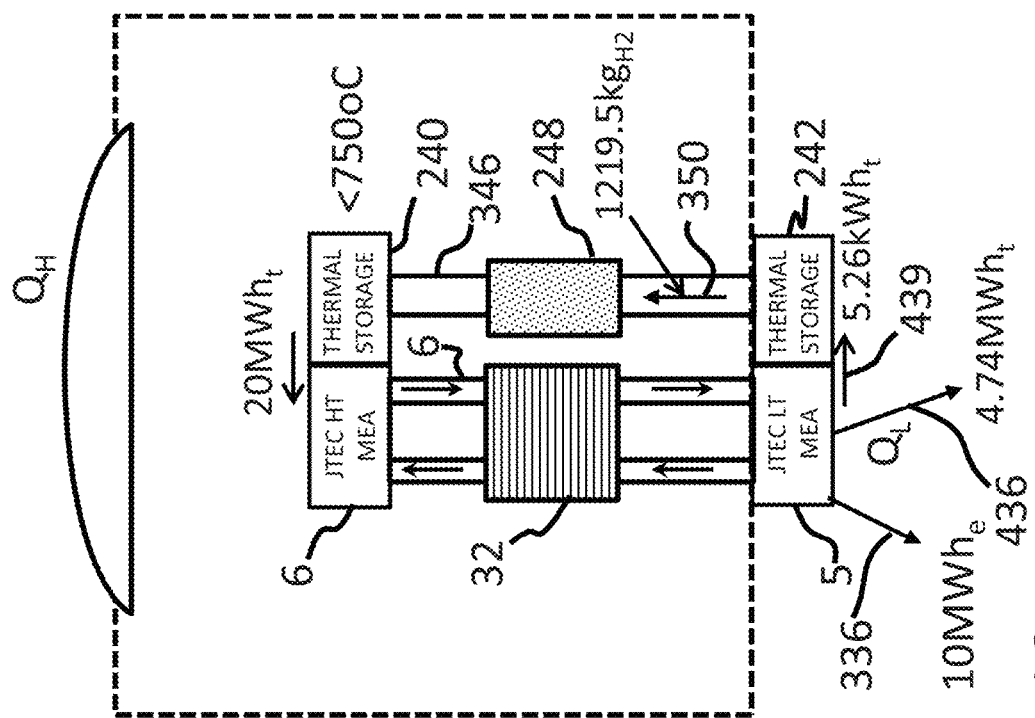
FIG. 16 is an energy balance diagram of a 80% Carnot efficient JTEC conversion system with "ideal" energy storage and heat transfer conditions operating on stored heat, in accordance with an embodiment of the present invention.

FIG. 16 depicts operation under conditions when there is no solar heat input, according to the embodiment of the present invention depicted in FIG. 15. With no solar input and continued heat consumption by the high temperature MEA stack 6 of the JTEC as it continues to generate power, the needed heat is supplied by high temperature reservoir 240. As heat is removed from high temperature reservoir 240, its temperature decreases ideally slightly below 750° C. (<750° C.) resulting in a drop in pressure. As the pressure decreases below the pressure of the low temperature reservoir 242, hydrogen 350 desorbs from the low temperature reservoir 242 and flows to the high temperature reservoir 240 via a conduit 3'46 where it is absorbed, causing the metal hydride in reservoir 240 to release its latent heat. The released heat is supplied to the JTEC high temperature MEA stack 6. With continued operation, the temperature of high temperature reservoir 240 is maintained at a high level as it eventually reabsorbs all of the 1219.5 kg hydrogen that it supplied to the low temperature reservoir 242. In the process, it releases its 20 $MWh_t$ of stored latent heat to the JTEC's high temperature MEA 6. Now operating on a slightly lower heat source temperature and thereby lower efficiency, the JTEC produces slightly less than 10 $KWh_e$ of electricity. It continues to produce waste heat output at the low temperature MEA 5, although slightly higher than 10 $MWh_t$. The JTEC low temperature MEA 5 and low temperature reservoir 242 may optionally be thermally coupled to each other. The 5.26 $MWh_t$ of latent heat of desorption needed to release hydrogen 350 can be taken from the 10 $MWh_t$ of rejected waste heat from the MEA 5.

Notably, the overall amount of waste heat rejected is 20 $MWh_t$ (i.e., 10 $MWh_t$+5.26 $MWh_t$+4.74 $MWh_t$), which is approximately 50% of the solar heat input and consistent with the projected approximately 50% conversion efficiency of the JTEC, assuming ideal metal hydride properties and no heat transfer losses.

Figure 17:
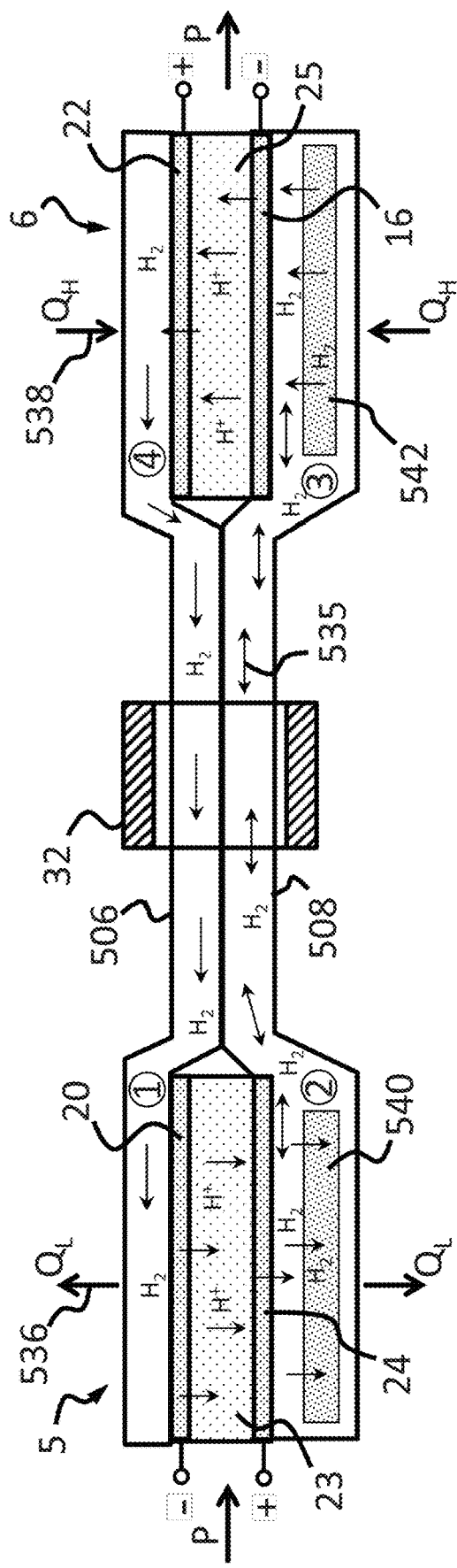
FIG. 17 is an operating diagram of a JTEC, wherein the hydrogen reservoirs are located inside of the hydrogen flow channels of the JTEC itself at the low and high temperature MEAs, respectively, in accordance with an embodiment of the present invention, wherein the JTEC is operating on heat from a primary source to generate power and store energy as compressed working fluid and heat.
Figure 18:
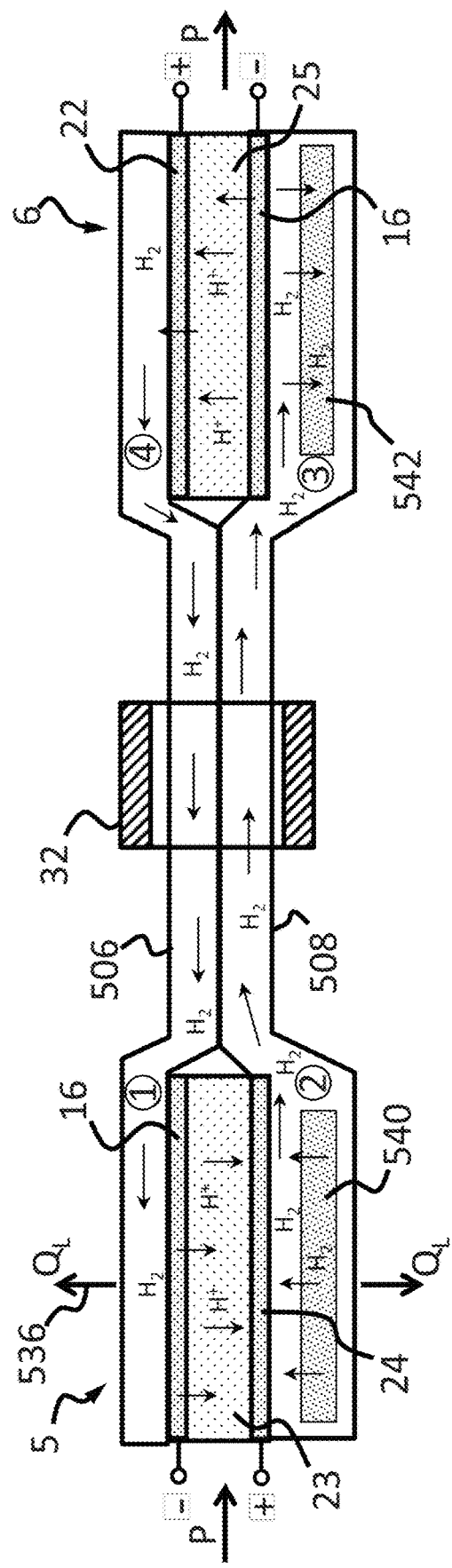
FIG. 18 is an operating diagram of a JTEC, wherein the hydrogen reservoirs are located inside of the hydrogen flow channels of the JTEC itself at the low and high temperature MEAs, respectively, in accordance with an embodiment of the present invention, wherein the JTEC is operating to generate power from energy stored in the form of compressed working fluid and heat.

FIGS. 17 and 18 show an alternate preferred embodiment of the present invention. In the embodiment of FIGS. 17-18, the hydrogen reservoirs 540 and 542 are located inside the hydrogen flow channels of the JTEC itself at the low and high temperature MEAs 5 and 6, respectively. In this configuration, the reservoirs 540, 542 are fully integrated into the MEA stacks 5, 6, respectively, for more effective thermal coupling. High pressure conduit 508 couples hydrogen flow between the high pressure sides of MEAs 5 and 6, as well between reservoirs 540 and 542, while low pressure conduit 506 couples hydrogen flow between the low pressure sides of MEAs 5 and 6, as well between reservoirs 540 and 542.

Referring to FIG. 17, the hydrogen flow 535 will vary depending on the magnitude of heat 538, $Q_H$, input relative to the amount of power being consumed form the engine. As previously described, operation of the metal hydride thermal energy storage system is such that heat source heat input 538 raises the temperature of the low pressure reservoir 542 to its operating temperature at which its pressure exceeds that of the low temperature reservoir 540. The increase causes the high temperature reservoir 542 to release hydrogen which uses heat energy input 538 as a source for latent heat of desorption. The desorbed hydrogen 535 flows through conduit 508 to low temperature reservoir 540 where it is absorbed with the heat of absorption being released as a portion of heat 536 rejected at low temperature MEA 5. Operating conditions are possible wherein the electrical power draw from the JTEC is high enough that the hydrogen released from the reservoir 542 as thermal energy is stored therein, will be expanded through the MEA 6, flows through conduit 506 to MEA 5 which pumps it back to the reservoir 540 as opposed to traveling directly to reservoir through conduit 508.

FIG. 18 shows operation under conditions of no external high temperature heat input, $Q_H=0$. Under this condition, the high temperature reservoir 542 supplies heat to the high temperature MEA stack 6 as it absorbs hydrogen from the low temperature reservoir 540 via the conduit 508. The low temperature reservoir 540 extracts latent heat of desorption 536 from the low temperature MEA stack 5 as it continues to generate heat by compressing hydrogen in response to power being produced by the high temperature MEA stack 6. As the JTEC operates under this condition, the amount of heat 536 rejected at low temperature MEA 5 is reduced below that rejected when hydrogen is being absorbed by reservoir 540.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An electrochemical direct heat to electricity converter comprising:
   a working fluid;
   an electrochemical cell comprising at least one membrane electrode assembly including a first porous electrode, a second porous electrode and at least one membrane, wherein the at least one membrane is sandwiched between the first and second porous electrodes and is a conductor of ions of the working fluid;
   an external load;
   a first conduit containing the working fluid at a first pressure and a second conduit containing the working fluid at a second pressure which is lower than the first pressure, the first conduit being a high pressure conduit coupled to the first porous electrode and the second conduit being a low pressure conduit coupled to the second porous electrode;
   a primary thermal energy source thermally coupled to the electrochemical cell and arranged adjacent to one of the first conduit or the second conduit; and
   a thermal storage reservoir thermally coupled to the electrochemical cell and arranged adjacent to the other of the first conduit or the second conduit, opposite to the primary thermal energy source,
   wherein the electrochemical cell operates on heat to produce electricity and wherein when thermal energy available from the primary thermal energy source is greater than necessary to meet demands of the external load, excess thermal energy passed through the electrochemical cell is stored in the thermal storage reservoir, and when the thermal energy available from the primary thermal energy source is insufficient to meet the demands of the external load, at least a portion of the excess thermal energy stored in the thermal storage reservoir passes to the electrochemical cell to supply power to the external load, and
   wherein the converter produces electricity with the expansion of the working fluid through the membrane electrode assembly from the high pressure conduit to the low pressure conduit.

2. The electrochemical direct heat to electricity converter according to claim 1, wherein the at least one membrane electrode assembly is thermally coupled to the thermal storage reservoir and produces electrical power as heat is supplied from the thermal storage reservoir to the at least one membrane electrode assembly with the expansion of the working fluid therethrough.

3. The electrochemical direct heat to electricity convertor according to claim 2, wherein the thermal storage reservoir stores heat energy as a latent heat of hydrogen desorption from a metal hydride material.

4. The electrochemical direct heat to electricity convertor according to claim 1, wherein the primary thermal energy source is arranged adjacent to the first conduit and the thermal storage reservoir is arranged adjacent to the second conduit.

* * * * *